US012646465B2

(12) United States Patent
Gu et al.

(10) Patent No.: US 12,646,465 B2
(45) Date of Patent: Jun. 2, 2026

(54) DISPLAY APPARATUS

(71) Applicant: SAMSUNG DISPLAY CO., LTD., Yongin-si (KR)

(72) Inventors: Bonseog Gu, Yongin-si (KR); Jinyoung Roh, Yongin-si (KR); Haekwan Seo, Yongin-si (KR); Jaekeun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/024,172

(22) Filed: Jan. 16, 2025

(65) Prior Publication Data

US 2025/0349258 A1 Nov. 13, 2025

(30) Foreign Application Priority Data

May 8, 2024 (KR) ........................ 10-2024-0060755

(51) Int. Cl.
*G09G 3/3241* (2016.01)

(52) U.S. Cl.
CPC ... *G09G 3/3241* (2013.01); *G09G 2300/0842* (2013.01)

(58) Field of Classification Search
CPC .. G06F 3/0446; G06F 3/04164; G06F 3/0445; G06F 2203/04112; G06F 3/04166; G06F 2203/04111; H10K 59/40; H10K 59/87; A61B 5/6824; A61B 5/0537; A61B 5/4872; A61B 5/4875; A61B 5/6898; A61B 5/4869
See application file for complete search history.

(56) References Cited

U.S. PATENT DOCUMENTS

| | | | | |
|---|---|---|---|---|
| 10,964,267 B2 | 3/2021 | Park et al. | | |
| 2008/0291351 A1* | 11/2008 | Han | .................... | G02F 1/13624 349/48 |
| 2014/0062331 A1* | 3/2014 | Nam | .................... | G09G 3/3233 315/226 |

(Continued)

FOREIGN PATENT DOCUMENTS

| | | |
|---|---|---|
| CN | 207165217 U | 3/2018 |
| CN | 114299876 B | 8/2023 |

(Continued)

*Primary Examiner* — Md Saifel A Siddiqui
(74) *Attorney, Agent, or Firm* — F. CHAU & ASSOCIATES, LLC

(57) ABSTRACT

A display apparatus including: a first pixel in an odd-numbered column; and a second pixel in an even-numbered column and in a same row as the first pixel, each of the first and second pixel includes: a light-emitting device; a first transistor to output a current corresponding to a data signal; a second transistor connected to the first transistor; a sensing transistor connected to the light-emitting device and a sensing line; and a distribution transistor connected in series with the second transistor, between a data line to supply the data signal and the second transistor, a conductivity type of the distribution transistor of the first pixel is different from a conductivity type of the distribution transistor of the second pixel, and when the second transistor of the first and second pixels are turned on, the distribution transistor of the first and second pixels are sequentially turned on.

20 Claims, 20 Drawing Sheets

(56) References Cited

U.S. PATENT DOCUMENTS

| | | | | |
|---|---|---|---|---|
| 2016/0055794 | A1* | 2/2016 | Lee | G09G 3/3266 345/212 |
| 2016/0155379 | A1* | 6/2016 | Na | G09G 3/3233 345/215 |
| 2017/0039941 | A1* | 2/2017 | Wu | G09G 3/3258 |
| 2019/0147798 | A1* | 5/2019 | Hwang | G09G 3/3233 345/691 |
| 2019/0251904 | A1* | 8/2019 | Kim | G09G 3/3283 |
| 2024/0087538 | A1* | 3/2024 | Kim | G09G 3/3233 |
| 2024/0112631 | A1* | 4/2024 | Toyomura | G09G 3/3233 |

FOREIGN PATENT DOCUMENTS

| | | | |
|---|---|---|---|
| KR | 10-2005-0003753 | A | 1/2005 |
| KR | 10-2018-0093147 | A | 8/2018 |

* cited by examiner

DISPLAY APPARATUS

CROSS-REFERENCE TO RELATED APPLICATION

This application claims priority under 35 U.S.C. § 119 to Korean Patent Application No. 10-2024-0060755, filed on May 8, 2024, in the Korean Intellectual Property Office, the disclosure of which is incorporated by reference herein in its entirety.

1. Technical Field

One or more embodiments of the disclosure relate to a display apparatus and a pixel included therein.

2. Description of the Related Art

A display apparatus includes a plurality of gate lines, a plurality of data lines, and a plurality of pixels connected to the plurality of gate lines and the plurality of data lines. To apply a data signal to each of the plurality of data lines, a data driving circuit must have a corresponding number of output lines. However, since this requires multiple integrated circuits, it results in increased manufacturing costs for the display apparatus.

SUMMARY

One or more embodiments of the disclosure include a display apparatus and a driving method that reduce the number of output lines in a data driving circuit.

According to an embodiment of the disclosure, there is provided a display apparatus including: a first pixel in an odd-numbered column; and a second pixel in an even-numbered column and in a same row as the first pixel, wherein each of the first pixel and the second pixel includes: a light-emitting device; a first transistor configured to output a current corresponding to a data signal; a second transistor connected to the first transistor; a sensing transistor connected to the light-emitting device and a sensing line; and a distribution transistor connected in series with the second transistor, between a data line configured to supply the data signal and the second transistor, wherein a conductivity type of the distribution transistor of the first pixel is different from a conductivity type of the distribution transistor of the second pixel, and when the second transistor of the first pixel and the second transistor of the second pixel are turned on, the distribution transistor of the first pixel and the distribution transistor of the second pixel are sequentially turned on.

The display apparatus further includes: an output line connected to a first data line connected to the first pixel and a second data line connected to the second pixel; and a driving circuit connected to the output line and configured to supply the data signal through the output line.

A first terminal of the first transistor is connected to a driving voltage line, and each of the first pixel and the second pixel further includes: a third transistor connected to a second terminal of the first transistor and the light-emitting device; and a capacitor connected to the driving voltage line and a gate of the first transistor.

A first gate signal is supplied to the second transistor of the first pixel and the second transistor of the second pixel, a second gate signal is supplied to the third transistor of the first pixel and the third transistor of the second pixel, and a sensing gate signal is supplied to the sensing transistor of the first pixel and the sensing transistor of the second pixel.

A delayed second gate signal, which is delayed from the second gate signal supplied to the third transistor of the first pixel, is supplied to the distribution transistor of the first pixel and the distribution transistor of the second pixel, and a voltage level of the delayed second gate signal changes in a section where the first gate signal is at a level voltage that turns on the second transistor.

Each of the first pixel and the second pixel further includes: a third transistor connected to a driving voltage line and a first terminal of the first transistor; a fourth transistor connected to a gate of the first transistor and the light-emitting device; and a capacitor connected to the driving voltage line and the gate of the first transistor.

A first gate signal is supplied to the second transistor of the first pixel and the second transistor of the second pixel, a second gate signal is supplied to the third transistor of the first pixel and the third transistor of the second pixel, a sensing gate signal is supplied to the sensing transistor of the first pixel and the sensing transistor of the second pixel, and a fourth gate signal is supplied to the fourth transistor of the first pixel and the fourth transistor of the second pixel.

A delayed second gate signal, which is delayed from the second gate signal supplied to the third transistor of the first pixel, is supplied to the distribution transistor of the first pixel and the distribution transistor of the second pixel, and a voltage level of the delayed second gate signal changes in a section where the first gate signal is at a level voltage that turns on the second transistor.

Each of the first pixel and the second pixel further includes: a fifth transistor connected to a second terminal of the first transistor and the light-emitting device; and a second capacitor connected to a gate of the third transistor and the first terminal of the first transistor, wherein the second gate line is connected to the fifth transistor of the first pixel and the fifth transistor of the second pixel.

A conductivity type of the sensing transistor is a same as a conductivity type of the distribution transistor of the first pixel or a conductivity type of the distribution transistor of the second pixel.

According to an embodiment of the disclosure, there is provided a display apparatus including: a first pixel in an odd-numbered column; and a second pixel in an even-numbered column and in a same row as the first pixel, wherein each of the first pixel and the second pixel includes: a light-emitting device; a first transistor configured to output a current corresponding to a data signal; a second transistor connected to a data line configured to supply the data signal; a sensing transistor connected to the light-emitting device and a sensing line; and a distribution transistor connected in series with the second transistor, between the second transistor and a gate of the first transistor, wherein a conductivity type of the distribution transistor of the first pixel is different from a conductivity type of the distribution transistor of the second pixel, and when the second transistor of the first pixel and the second transistor of the second pixel are turned on, the distribution transistor of the first pixel and the distribution transistor of the second pixel are sequentially turned on.

The display apparatus further including: an output line connected to a first data line connected to the first pixel and a second data line connected to the second pixel; and a driving circuit connected to the output line and configured to supply the data signal through the output line.

A first terminal of the first transistor is connected to a driving voltage line, and each of the first pixel and the second pixel further includes: a third transistor connected to a second terminal of the first transistor and the light-emitting device; and a capacitor connected to the driving voltage line and a gate of the first transistor.

A first gate signal is supplied to the second transistor of the first pixel and the second transistor of the second pixel, a second gate signal is supplied to the third transistor of the first pixel and the third transistor of the second pixel, and a sensing gate signal is supplied to the sensing transistor of the first pixel and the sensing transistor of the second pixel.

A delayed first gate signal, which is delayed from the first gate signal supplied to the second transistor of the first pixel, is supplied to the distribution transistor of the first pixel and the distribution transistor of the second pixel, and a voltage level of the delayed first gate signal changes in a section where the first gate signal is at a level voltage that turns on the second transistor.

Each of the first pixel and the second pixel further includes: a third transistor connected to a driving voltage line and a first terminal of the first transistor; a fourth transistor connected to a gate of the first transistor and the light-emitting device; and a capacitor connected to the driving voltage line and the gate of the first transistor.

A first gate signal is supplied to the second transistor of the first pixel and the second transistor of the second pixel, a second gate signal is supplied to the third transistor of the first pixel and the third transistor of the second pixel, a sensing gate signal is supplied to the sensing transistor of the first pixel and the sensing transistor of the second pixel, and a fourth gate signal is supplied to the fourth transistor of the first pixel and the fourth transistor of the second pixel.

A delayed first gate signal, which is delayed from the first gate signal supplied to the second transistor of the first pixel, is supplied to the distribution transistor of the first pixel and the distribution transistor of the second pixel, and a voltage level of the delayed first gate signal changes in a section where the first gate signal is at a level voltage that turns on the second transistor.

Each of the first pixel and the second pixel further includes: a fifth transistor connected to a second terminal of the first transistor and the light-emitting device; and a second capacitor connected to a gate of the third transistor and the first terminal of the first transistor, wherein the second gate line is connected to the fifth transistor of the first pixel and the fifth transistor of the second pixel.

A conductivity type of the sensing transistor is a same as a conductivity type of the distribution transistor of the first pixel or a conductivity type of the distribution transistor of the second pixel.

BRIEF DESCRIPTION OF THE DRAWINGS

The above and other features of certain embodiments of the disclosure will become more apparent from the following description taken in conjunction with the accompanying drawings, in which.

DETAILED DESCRIPTION OF THE EMBODIMENTS

Figure 1A:
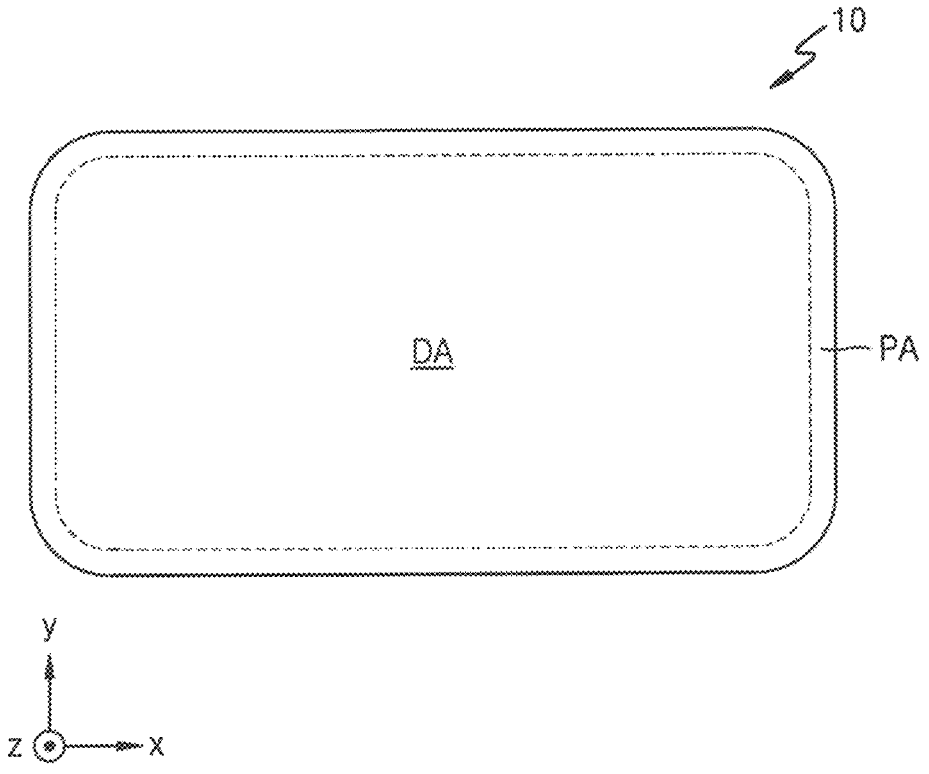
FIGS. 1A and 1B are schematic views of a display apparatus according to an embodiment.

Detailed reference will now be made to the embodiments, examples of which are illustrated in the accompanying drawings, where like reference numerals refer to like elements throughout. It should be understood that the present embodiments may have different forms and are not limited to the descriptions set forth herein. As used herein, the term "and/or" includes any and all combinations of the listed items. Throughout the disclosure, the expression "at least one of a, b or c" refers to any combination of a, b, and c, including only a, only b, only c, any pair of these or all three.

While terms such as "first" and "second" may be used to describe various elements, these elements are not limited to the above terms. The above terms are simply used to distinguish one element from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or elements but do not preclude the addition of one or more other features or elements.

It will be understood that when a layer, region, or element is referred to as being formed "on" another layer, area, or element, it can be directly or indirectly formed on the other layer, region, or element, with intervening layers, regions, or elements possibly being present.

The sizes of elements in the drawings may be exaggerated or reduced for convenience of explanation. As an example, the size and thickness of each element shown in the drawings are arbitrarily depicted for descriptive purposes, and are not to be considered limiting.

In the present specification, "A and/or B" refers to A or B, or A and B. In the present specification, "at least one of A and B" refers to A or B, or A and B.

In the following embodiments, when X and Y are connected to each other, this may include a case where X and Y are physically connected to each other, a case where X and Y are functionally connected to each other, and a case where X and Y are electrically connected to each other. Additionally, when X and Y are connected to each other, this may include a case where X and Y are directly connected to each other and a case where X and Y are indirectly connected to each other with another element therebetween. In this regard, X and Y may be elements, such as, apparatuses, devices, circuits, wires, electrodes, terminals, films, layers, areas, or the like.

For example, when X and Y are electrically connected to each other, this may include a case where X and Y are directly electrically connected to each other and/or a case where X and Y are indirectly electrically connected to each other with another element therebetween. When X and Y are indirectly electrically connected to each other, this may include a case where one or more elements (e.g., switches, transistors, capacitive elements, inductors, resistance elements, diodes, etc.) that enable electrical connection between X and Y are connected between X and Y. Thus, X and Y are not restricted to a specific connection relationship, such as the one shown in the drawings or descried in detail. Rather, X and Y may include other connection relationships in addition those depicted in the drawings or described in the detailed description.

In the embodiments described below, "ON" used in association with an element's state may denote an active state of an element, and "OFF" may denote an inactive state of an element. "ON" used in association with a signal received by an element may denote a signal that activates the element, and "OFF" may denote a signal that deactivates the element. An element may be activated by a high-level voltage or a low-level voltage. As an example, a P-channel transistor (a P-type transistor) may be activated by a low-level voltage, and an N-channel transistor (an N-type transistor) may be activated by a high-level voltage. Accordingly, it should be understood that "ON" voltages for a P-channel transistor and an N-channel transistor are opposite (low vs. high) voltage levels.

In an embodiment described hereinafter, an x direction, a y direction, and a z direction are not limited to directions in three axes on a rectangular coordinate system and may be interpreted in a broader sense. For example, the x direction, the y direction, and the z direction may be perpendicular to one another or may refer to different directions that are not perpendicular to one another.

Figure 1B:
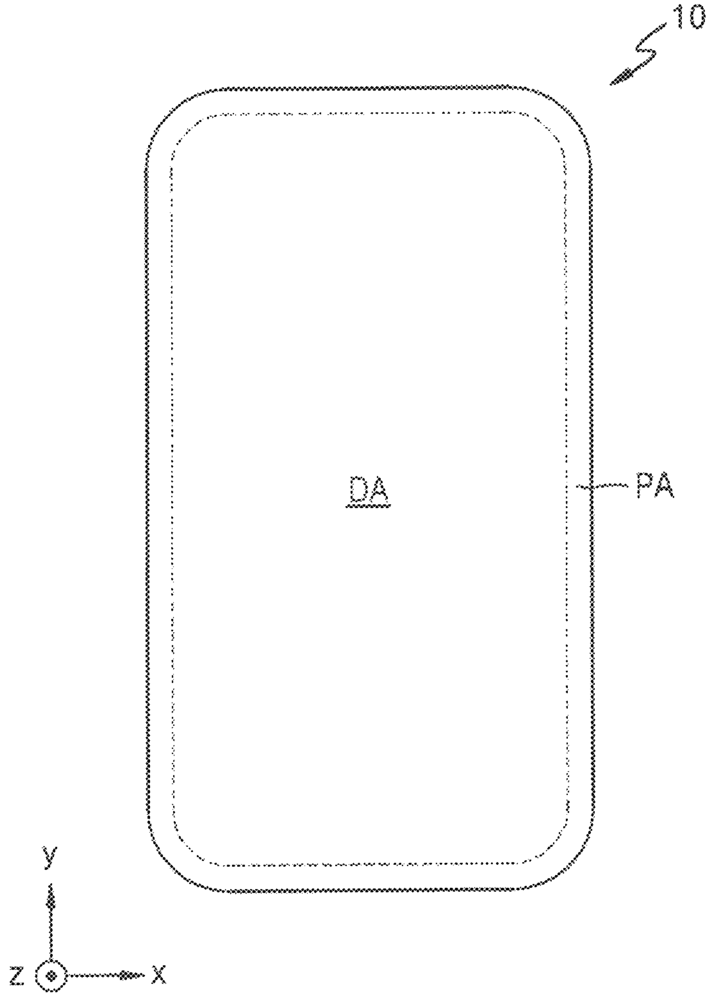
Figure 2:
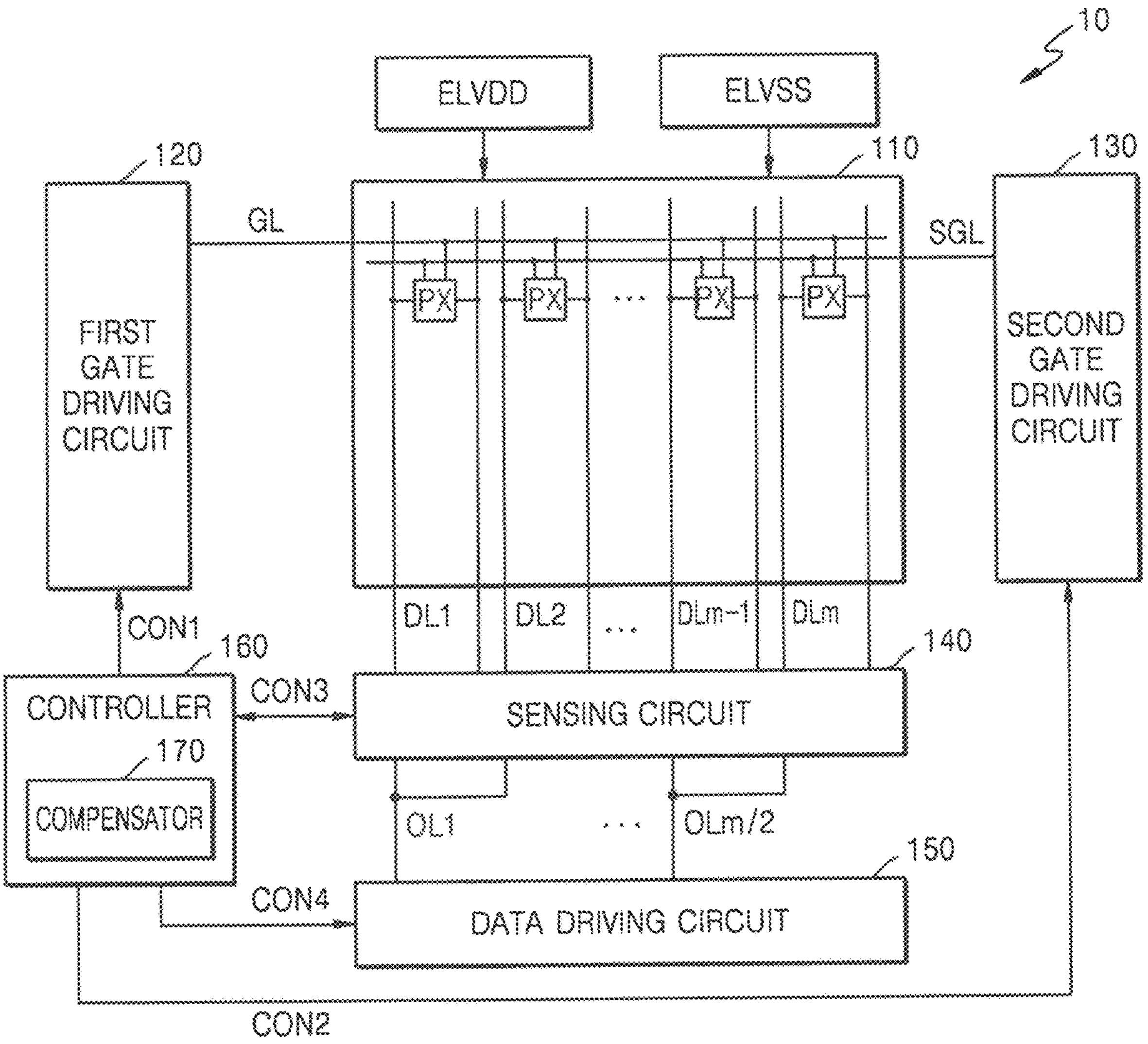
FIG. 2 is a schematic diagram of a display apparatus according to an embodiment.

FIGS. 1A and 1B are schematic views of a display apparatus 10 according to an embodiment. FIG. 2 is a schematic diagram of a display apparatus 10 according to an embodiment.

Referring to FIGS. 1A and 1B, the display apparatus 10 may include a display area DA for displaying an image and a peripheral area PA outside the display area DA. The display area DA may be entirely surrounded by the peripheral area PA.

In a plan view, the display area DA may have a rectangular shape. According to another embodiment, the display area DA may have a polygonal shape, such as a triangular shape, a pentagonal shape, a hexagonal shape, etc., a circular shape, an oval shape, an amorphous shape, etc. The display area DA may have a rounded corner. In an embodiment, the display apparatus 10 may have the display area DA, where the length in the x direction is greater than the length in the y direction, as illustrated in FIG. 1A. In another embodiment, the display apparatus 10 may have the display area DA, where the length in the y direction is greater than the length in the x direction, as illustrated in FIG. 1B.

Referring to FIG. 2, the display apparatus 10 according to an embodiment may include a pixel area 110, a first gate driving circuit 120, a second gate driving circuit 130, a sensing circuit 140, a data driving circuit 150, and a controller 160. The display apparatus 10 may include a display panel, and the display panel may include a substrate.

The pixel area 110 may be an area corresponding to the display area DA of the substrate. A plurality of gate lines GL, a plurality of data lines DL1 to DLm, and a plurality of pixels PX connected to the plurality of gate lines GL and the plurality of data lines DL1 to DLm may be arranged in the pixel area 110. The plurality of pixels PX may be arranged in various forms, such as a stripe arrangement, a pentile arrangement, a diamond arrangement, and a mosaic arrangement.

In an embodiment, when the display apparatus 10 is an organic light-emitting display apparatus, the pixels PX may be driven by receiving a driving voltage ELVDD and a common voltage ELVSS. Each of the pixels PX may include an organic light-emitting diode as a display element (e.g., a light-emitting device), and the organic light-emitting diode may be connected to a pixel circuit. The pixel PX may emit, for example, red, green, blue, or white light through the organic light-emitting diode. The pixel PX may be connected to a corresponding gate line among the plurality of gate lines GL and a corresponding data line among the plurality of data lines DL1 to DLm.

The pixel circuit may include a plurality of transistors and at least one capacitor. In an embodiment, some of the plurality of transistors included in the pixel circuit may be P-type transistors, while others may be N-type transistors. In another embodiment, the plurality of transistors included in the pixel circuit may be P-type transistors. In another embodiment, the plurality of transistors included in the pixel circuit may be N-type transistors. Each of the P-type transistors may be a silicon transistor. Each of the N-type transistors may be an oxide transistor.

The silicon transistor may be a low temperature polysilicon (LTPS) thin-film transistor in which a semiconductor layer includes amorphous silicon, poly silicon, etc. The oxide transistor may be a low temperature polycrystalline oxide (LTPO) thin-film transistor in which a semiconductor layer includes oxide. However, this is an example, and the N-type transistors are not limited thereto. For example, the semiconductor layer included in the N-type transistor may include an inorganic semiconductor (e.g., amorphous silicon or poly silicon) or an organic semiconductor.

Each of the gate lines GL may extend in the x direction (e.g., a row direction) and be connected to pixels PX arranged in the same row (e.g., a horizontal line). Each of the gate lines GL may be configured to transmit a gate signal to the pixels PX in the same row. Each of the data lines DL1 to DLm may extend in the y direction (e.g., a column direction) and be connected to pixels PX arranged in the same column (e.g., a vertical line). Each of the data lines DL1 to DLm may transmit a data signal to the pixels PX in the same column in synchronization with the gate signal.

In an embodiment, the peripheral area PA may be a non-display area where pixels PX are not arranged. In the peripheral area PA of the substrate, various conductive lines may be arranged to transmit electrical signals to the pixels PX, along with external circuits electrically connected to the pixel circuits and pads for attaching a printed circuit board or a driver integrated circuit (IC) chip. For example, the peripheral area PA may include the first gate driving circuit 120, the second gate driving circuit 130, the sensing circuit 140, the data driving circuit 150, and the controller 160.

The first gate driving circuit 120 may be connected to the plurality of gate lines GL, generate a gate signal in response to a driving control signal CON1 from the controller 160, and sequentially supply the gate signal to the gate lines GL. Each of the gate lines GL may be connected to the gate of a transistor included in the pixel PX.

Although it is illustrated in FIG. 2 that the pixel PX is connected to one gate line, this is an example. The pixel PX may be connected to two or more gate lines, with the first gate driving circuit 120 supplying two or more gate signals to the corresponding gate lines at different timings when a gate-on voltage is applied.

The second gate driving circuit 130 may be connected to a plurality of sensing gate lines SGL and sequentially supply a gate signal to the sensing gate lines SGL in response to a driving control signal CON2 from the controller 160.

The gate signal may serve as a gate control signal that controls the turn-on and turn-off of a transistor connected to the gate line GL and/or the sensing gate line SGL. The gate signal may include a gate-on voltage to turn the transistor on and a gate-off voltage to turn the transistor off.

In FIG. 2, the first gate driving circuit 120 and the second gate driving circuit 130 are provided as separate driving units. However, in another embodiment, the first gate driving circuit 120 may supply a gate signal to the sensing gate lines SGL instead of the second gate driving circuit 130. Alternatively, instead of forming a separate sensing gate line SGL, the connection between the pixels PX and the sensing lines SL may be controlled using the gate line GL.

The sensing circuit 140 may be connected to a plurality of sensing lines SL, and in the sensing mode, the sensing circuit 140 may sense characteristic information from the pixels PX through the sensing lines SL in response to a driving control signal CON3 from the controller 160. In an embodiment, the sensing line SL may be provided in each column. The sensing circuit 140 may convert the sensed characteristic information into digital sensing data and output the digital sensing data.

The data driving circuit 150 may be connected to a plurality of output lines OL1 to OLm/2, and the plurality of output lines OL1 to OLm/2 may be connected to the plurality of data lines DL1 to DLm. Each of the plurality of output lines OL1 to OLm/2 may be connected to two data lines. Because the number of output lines is less than the number of data lines, the number of output lines connected to the data driving circuit 150 is reduced, thereby reducing manufacturing costs. The data driving circuit 150 may supply a data signal to the data lines DL1 to DLm through the output lines OL1 to OLm/2 in response to a driving control signal CON4 from the controller 160. The data signal supplied through a data line may be supplied to a pixel PX to which the gate signal is supplied. The data driving circuit 150 may convert image data having gray levels input from the controller 160 into a data signal in the form of voltage or current.

The controller 160 may generate the driving control signals CON1, CON2, CON3, and CON4 based on synchronization signals input from the outside and supply the driving control signals CON1, CON2, CON3, and CON4 to the first gate driving circuit 120, the second gate driving circuit 130, the sensing circuit 140, and the data driving circuit 150. The controller 160 may include a compensator 170. In another embodiment, the compensator 170 may be separately configured outside the controller 160. The compensator 170 may correct externally input image data by reflecting the sensing data so that the characteristic deviation of the pixels PX is compensated and output the corrected input image to the data driving circuit 150. In other words, the compensator 170 may correct the externally input image data by incorporating the sensing data to compensate for the characteristic deviations of the pixels PX and then output the corrected image to the data driving circuit 150.

In an embodiment, the display apparatus 10 may be driven in a sensing mode and a display mode. In the sensing mode, the display apparatus 10 may sense characteristic information of a pixel PX and correct input image data by reflecting the sensed characteristic information. The characteristic information may include at least one of the threshold voltage and mobility of a driving transistor included in the pixel PX and/or deterioration information of an organic light-emitting diode included in the pixel PX. In the display mode, the display apparatus 10 may display an image corresponding to image data.

An operation of sensing the characteristic information of the pixel PX may be performed at least once before shipping the display apparatus. In addition, according to an embodiment, the operation of sensing the characteristic information of the pixel PX may be performed every predetermined sensing period during the actual use of the display apparatus. For example, the sensing operation may occur after power is applied (e.g., power on), between display periods, and/or before power is turned off (e.g., power off). In one sensing operation, characteristic information of pixels PX arranged in at least one row may be sensed.

In an embodiment, part or all of the first gate driving circuit 120 and the second gate driving circuit 130 may be directly formed in the peripheral area PA of the substrate during the process of forming transistors constituting the pixel circuit in the display area DA of the substrate. The sensing circuit 140, the data driving circuit 150, and the controller 160 may each be formed as a separate integrated circuit chip or may be formed as a single integrated circuit chip, and may be disposed on a flexible printed circuit board (FPCB) electrically connected to pads disposed on one side of the substrate. In another embodiment, the sensing circuit 140, the data driving circuit 150, and the controller 160 may be placed directly on the substrate by using a chip on glass (COG) or chip on plastic (COP) method.

Figure 3:
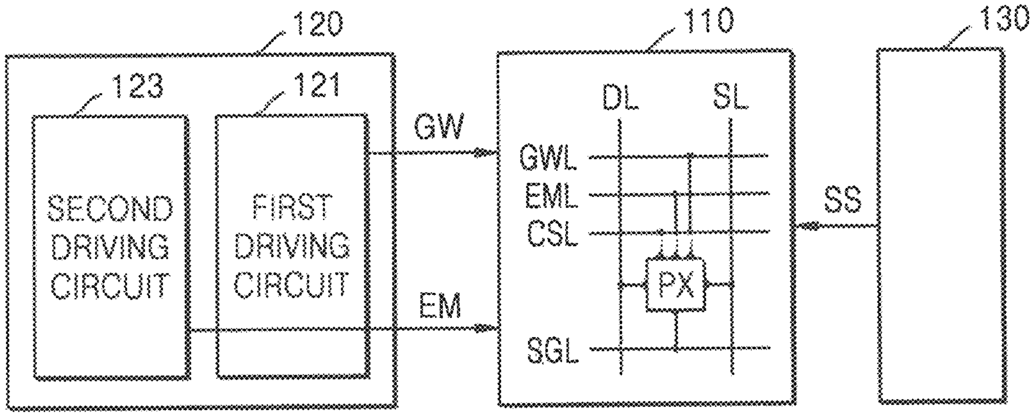
FIG. 3 is a schematic diagram showing a gate driving circuit and a pixel according to an embodiment.
Figure 4:
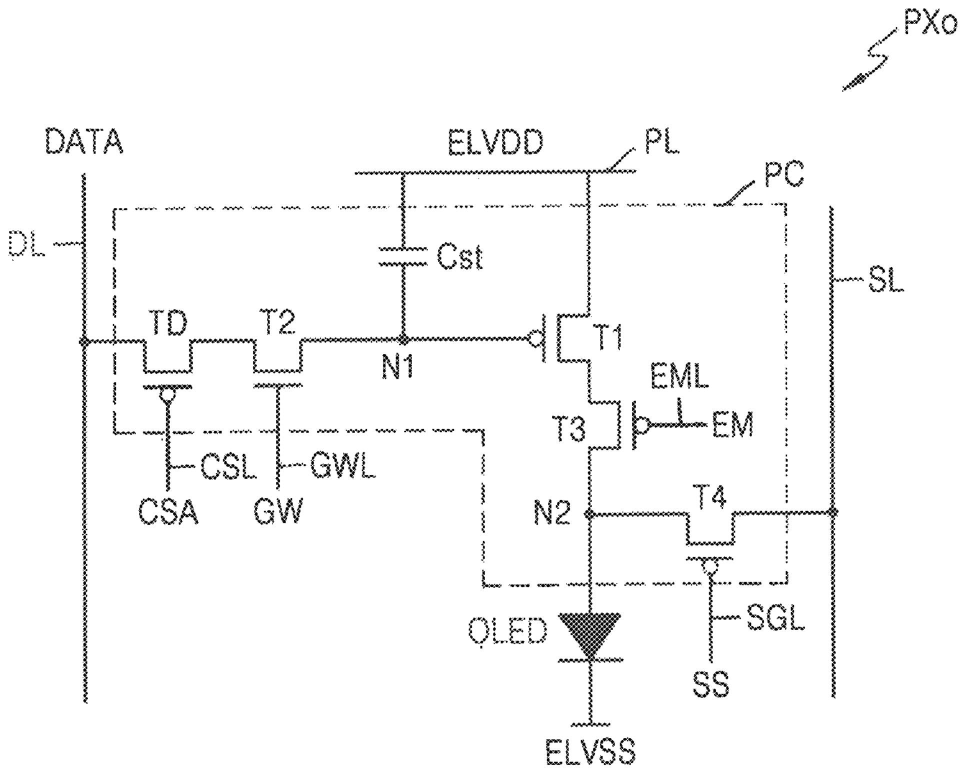
FIGS. 4 and 5 are schematic diagrams showing an equivalent circuit of a pixel according to an embodiment.
Figure 5:
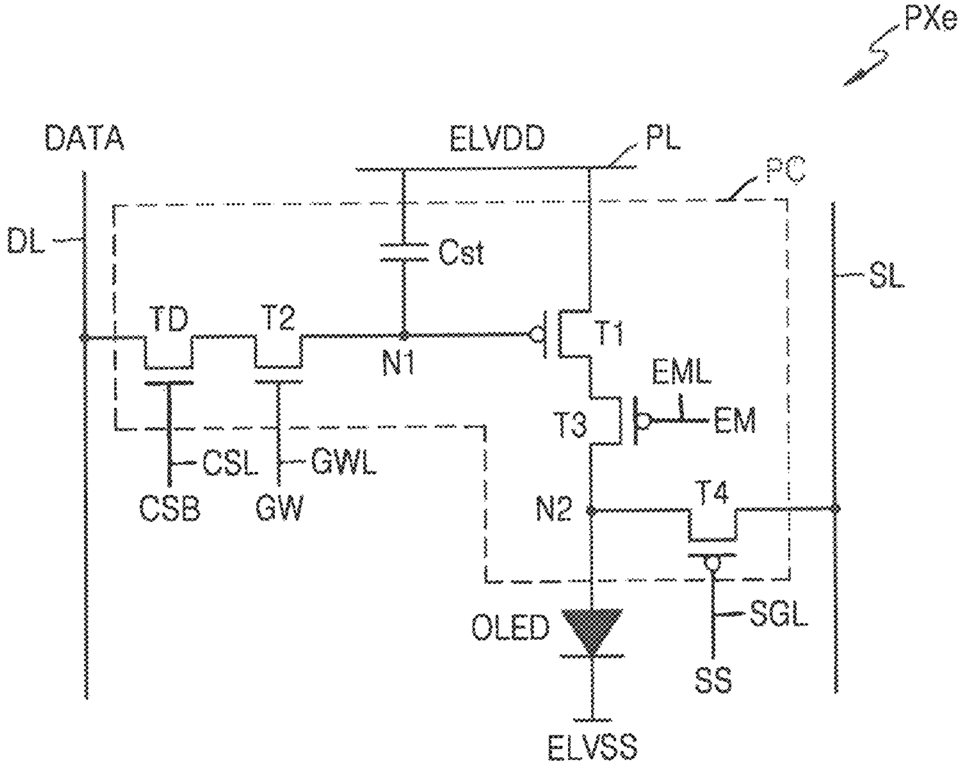
Figure 6:
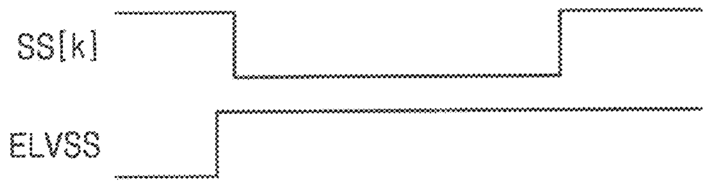
FIG. 6 is a schematic diagram for explaining a sensing operation of a pixel according to an embodiment.

FIG. 3 is a schematic diagram showing a gate driving circuit and a pixel according to an embodiment. FIGS. 4 and 5 are schematic diagrams showing an equivalent circuit of a pixel according to an embodiment. FIG. 6 is a schematic diagram for explaining a sensing operation of a pixel according to an embodiment.

In an embodiment, the pixel shown in FIG. 4 may be a pixel arranged in an odd-numbered column, and the pixel shown in FIG. 5 may be a pixel arranged in an even-numbered column. In another embodiment, the pixel shown in FIG. 4 may be a pixel arranged in an even-numbered column, and the pixel shown in FIG. 5 may be a pixel arranged in an odd-numbered column. Hereinafter, an example in which the pixel shown in FIG. 4 is a pixel PXo arranged in an odd-numbered column and the pixel shown in FIG. 5 is a pixel PXe arranged in an even-numbered column is described, and the pixel PXo arranged in the odd-numbered column and the pixel PXe arranged in the even-numbered column are collectively referred to as pixels PX.

Referring to FIG. 3, the pixel PX may be connected to a first gate line GWL, a second gate line EML, a sensing gate line (hereinafter, referred to as a 'third gate line') SGL, a control line CSL, a sensing line SL and a data line DL.

The first gate driving circuit 120 may include a first driving circuit 121 and a second driving circuit 123. The first driving circuit 121 may be connected to a plurality of first gate lines GWL and may sequentially supply a first gate signal GW to the first gate lines GWL. The second driving circuit 123 may be connected to a plurality of second gate lines EML and may sequentially supply a second gate signal EM to the second gate lines EML.

The second gate driving circuit 130 may be connected to a plurality of third gate lines SGL and, in the sensing mode, the second gate driving circuit 130 may supply a third gate signal SS to at least one selected third gate line SGL.

In an embodiment, the control line CSL may be one of the first gate line GWL and the second gate line EML. The control signal CS supplied to the control line CSL may be a gate signal output from one of the first driving circuit 121 and the second driving circuit 123. One of the first driving circuit 121 and the second driving circuit 123 may be connected to a plurality of control lines CSL and may supply a gate signal as the control signal CS to the control lines CSL.

The control signal CS may include a first control signal CSA supplied to the control line CSL of the pixel PXo (hereinafter, referred to as an 'odd-numbered column pixel') arranged in an odd-numbered column, and a second control signal CSB supplied to the control line CSL of the pixel PXe (hereinafter, referred to as an 'even-numbered column pixel') arranged in an even-numbered column. The first control signal CSA and the second control signal CSB may be supplied to the odd-numbered column pixel PXo and the even-numbered column pixel PXe without overlapping each other. In other words, first control signal CSA and the second control signal CSB may not be supplied at the same time.

In an embodiment, the control line CSL of the odd-numbered column pixel PXo and the control line CSL of the even-numbered column pixel PXe may be provided integrally with each other, and thus, the odd-numbered column pixel PXo and the even-numbered column pixel PXe may be connected to one control line CSL. The first control signal CSA and the second control signal CSB may be the same signal, in other words, a gate signal supplied from a driving circuit to the control line CSL.

In an embodiment, the control line CSL of the odd-numbered column pixel PXo and the control line CSL of the even-numbered column pixel PXe may be provided separately. The first control signal CSA and the second control signal CSB may be gate signals supplied from the same driving circuit, but with a time delay between them.

Referring to FIGS. 4 and 5, the pixel PX according to an embodiment may include a pixel circuit PC and a light-emitting device connected to the pixel circuit PC. In an embodiment, the light-emitting device may be an organic light-emitting diode OLED.

The pixel circuit PC may include first to fourth transistors T1 to T4, a capacitor Cst, and a distribution transistor TD. The first transistor T1 may be a driving transistor configured to output a driving current corresponding to a data signal, and the second to fourth transistors T2 to T4 and the distribution transistor TD may be switching transistors configured to transmit signals. A first terminal (e.g., first electrode) and second terminal (e.g., second electrode) of each of the distribution transistor TD and the first to fourth transistors T1 to T4 may each be a source or a drain depending on the voltages of the first terminal and the second terminal. For example, based on the voltages at the first and second terminals, the first terminal may function as the drain and the second terminal as the source, or vice versa, with the first terminal as the source and the second terminal as the drain. A node to which the gate of the first transistor T1 is connected may be a first node N1, and a node to which the first terminal of the fourth transistor T4 and the organic light-emitting diode OLED are connected may be a second node N2.

The first transistor T1, third transistor T3, and fourth transistor T4 of each of the odd-numbered column pixel PXo and the even-numbered column pixel PXe may be P-type transistors, and the second transistor T2 of each of the odd-numbered column pixel PXo and the even-numbered column pixel PXe may be an N-type transistor. The distribution transistor TD of the odd-numbered column pixel PXo may be a P-type transistor, and the distribution transistor TD of the even-numbered column pixel PXe may be an N-type transistor.

The first transistor T1 may be connected between a driving voltage line PL and the organic light-emitting diode OLED. The first transistor T1 may be connected to the driving voltage line PL and the third transistor T3. The first transistor T1 may include a gate connected to the first node N1, a first terminal connected to the driving voltage line PL, and a second terminal connected to the third transistor T3. The second terminal of the first transistor T1 may be connected to the pixel electrode of the organic light-emitting diode OLED via the third transistor T3.

The second transistor T2 may be connected between the data line DL and the first node N1. The second transistor T2 may be connected to the distribution transistor TD and the gate of the first transistor T1. The second transistor T2 may include a gate connected to the first gate line GWL, a first terminal connected to the distribution transistor TD, and a second terminal connected to the first node N1. The second transistor T2 may be turned on by the first gate signal GW supplied from the first gate line GWL, to electrically connect the data line DL to the first node N1 when the distribution transistor TD is turned on, and transmit a data signal DATA transmitted through the data line DL to the first node N1.

The third transistor T3 may be connected to the first transistor T1 and the organic light-emitting diode OLED. The third transistor T3 may include a gate connected to the second gate line EML, a first terminal connected to the second terminal of the first transistor T1, and a second terminal connected to the pixel electrode of the organic light-emitting diode OLED. The third transistor T3 may be turned on by the second gate signal EM supplied from the second gate line EML and, in response thereto, transmit a driving current output by the first transistor T1 to the organic light-emitting diode OLED.

The fourth transistor T4 (e.g., a sensing transistor) may be connected to the organic light-emitting diode OLED and the sensing line SL. The fourth transistor T4 may include a gate connected to the third gate line SGL, a first terminal connected to the pixel electrode of the organic light-emitting diode OLED, and a second terminal connected to the sensing line SL. The fourth transistor T4 may be turned on by the third gate signal SS supplied from the third gate line SGL and, in response thereto, electrically connect the pixel PX to the sensing line SL. When the fourth transistor T4 is turned on, the voltage or current of the second node N2 may be sensed through the sensing line SL.

The distribution transistor TD may be connected to the data line DL and the second transistor T2. The distribution transistor TD may include a gate connected to the control line CSL, a first terminal connected to the data line DL, and a second terminal connected to the first terminal of the second transistor T2. The distribution transistor TD of the odd-numbered column pixel PXo and the distribution transistor TD of the even-numbered column pixel PXe may each be turned on by the control signal CS and transmit the data signal DATA, from the data line DL, to the first terminal of the second transistor T2.

The capacitor Cst may be connected to the driving voltage line PL and the first transistor T1. A first electrode of the capacitor Cst may be connected to the driving voltage line PL, and a second electrode of the capacitor Cst may be connected to the gate of the first transistor T1. The capacitor Cst is a storage capacitor and may store a voltage corresponding to the data signal DATA of the first transistor T1.

The data signal DATA may be data in which sensing data is reflected and the threshold voltage and/or mobility of the first transistor T1 and/or deterioration of the organic light-emitting diode OLED are compensated. In other words, the data signal DATA may incorporate sensing data and compensate for the threshold voltage and/or mobility of the first transistor T1, as well as the degradation of the organic light-emitting diode OLED.

The organic light-emitting diode OLED may be connected to the first transistor T1 via the third transistor T3. The organic light-emitting diode OLED may include a pixel electrode (e.g., an anode) connected to the second terminal of the third transistor T3 and an opposite electrode (e.g., a cathode) facing the pixel electrode, and the opposite electrode may receive a common voltage ELVSS. The opposite electrode may be a common electrode common to a plurality of pixels PX. In the display mode, the organic light-emitting diode OLED may emit light with a luminance corresponding to the driving current output by the first transistor T1.

As shown in FIG. 6, in the sensing mode, when the third gate signal SS having a gate-on voltage is supplied from the third gate line SGL, the fourth transistor T4 may be turned on to thereby electrically connect the pixel PX to the sensing line SL. In this case, the common voltage ELVSS may be set to a certain voltage so that the organic light-emitting diode OLED does not emit light.

In an embodiment, when sensing characteristic information of the first transistor T1, the third gate signal SS with the gate-on voltage may be supplied from the third gate line SGL, while the first gate signal GW, the second gate signal EM, and the control signal CS are supplied to turn on the second transistor T2, the third transistor T3, and the distribution transistor TD. In an embodiment, when sensing characteristic information of the organic light-emitting diode OLED, the third gate signal SS with the gate-on voltage may also be supplied from the third gate line SGL, while the first gate signal GW, the second gate signal EM, and the control signal CS are supplied to turn off the second transistor T2, the third transistor T3, and the distribution transistor TD.

The embodiment of the disclosure is not limited thereto, and the gate-on voltages and gate-off voltages of the first gate signal GW, the second gate signal EM, and the control signal CS may be set according to the characteristic information to be sensed in the sensing mode. In addition, depending on the configuration of the current source and logic circuit connected to the data line DL and the sensing line SL, the gate-on voltages and gate-off voltages of the first gate signal GW, the second gate signal EM, and the control signal CS may be set.

Hereinafter, in the display mode, the operations of an odd-numbered column pixel PXo and an even-numbered column pixel PXe, which are adjacent to each other in any row (e.g., a pixel line) and form a pair, will be described.

Figure 7:
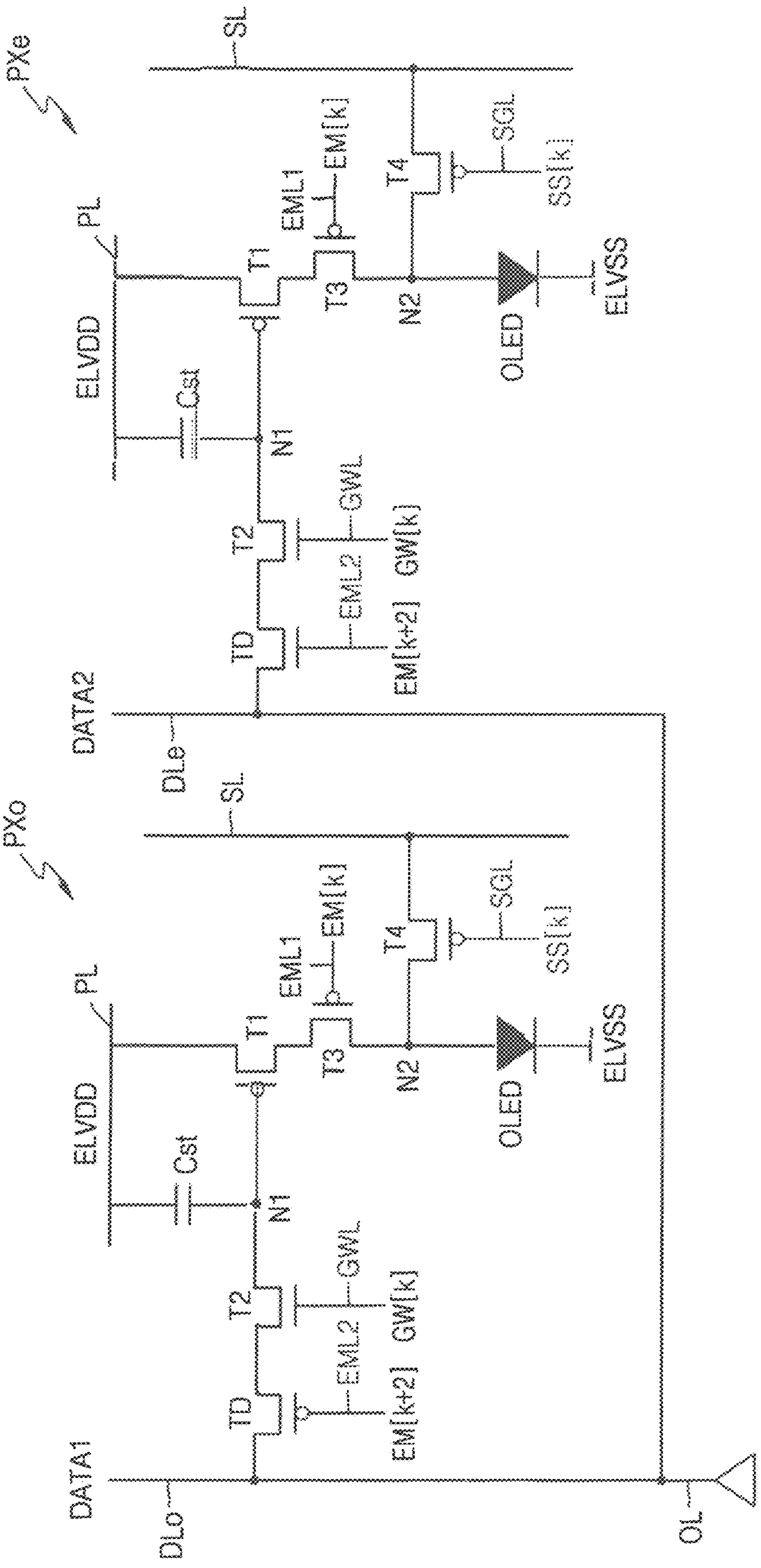
FIG. 7 is a circuit diagram schematically showing an odd-numbered column pixel and an even-numbered column pixel according to an embodiment.
Figure 8:
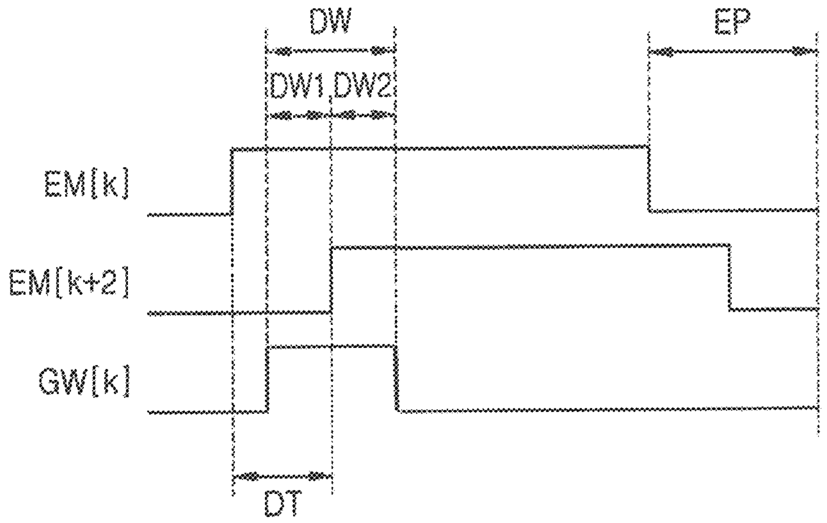
FIG. 8 is a diagram showing signals for explaining operations of the odd-numbered column pixel and the even-numbered column pixel of FIG. 7.

FIG. 7 is a circuit diagram schematically showing an odd-numbered column pixel and an even-numbered column pixel according to an embodiment. FIG. 8 is a diagram showing signals for explaining the operations of the odd-numbered column pixel and the even-numbered column pixel of FIG. 7.

In an embodiment, the distribution transistor TD of the odd-numbered column pixel PXo and the distribution transistor TD of the even-numbered column pixel PXe may be transistors of different conductivity types (e.g., impurity conductivity types). For example, as shown in FIG. 7, the distribution transistor TD of the odd-numbered column pixel PXo may be a P-type transistor, and the distribution transistor TD of the even-numbered column pixel PXe may be an N-type transistor. The control line CSL connected to the distribution transistor TD may be the second gate line EML, and the control signal CS may be the second gate signal EM output from the second driving circuit 123.

Referring to FIG. 7, an output line OL may be connected to a first data line DLo connected to the odd-numbered column pixel PX and a second data line DLe connected to the even-numbered column pixel PXe. The data driving circuit may supply a first data signal DATA1 to the first data line DLo and a second data signal DATA2 to the second data line DLe through the output line OL.

Hereinafter, the k-th gate signal may be a gate signal that is output k-th by the first gate driving circuit 120, and the k+2-th gate signal may be a gate signal that is output k+2-th by the first gate driving circuit 120. The k-th gate signal (e.g., a current gate signal) may be a signal output to the gate line of the k-th row, and the k+2-th gate signal (e.g., a subsequent gate signal) may be a signal output to the gate line of the k+2-th row. In an embodiment, a gate line connected to the gate line of the k+2-th row (e.g., a subsequent row) may be further disposed in the k-th row (e.g., a current row).

Referring to FIG. 8, the driving period of each of the odd-numbered column pixel PXo and the even-numbered column pixel PXe may include a data writing section DW and an emission section EP. The data writing section DW may include a first data writing section DW1 and a second data writing section DW2. In the display mode, the third gate signal SS may be at a high-level voltage and the fourth transistors T4 of the odd-numbered column pixel PXo and the even-numbered column pixel PXe may be turned off.

The second transistors T2 of the odd-numbered column pixel PXo and the even-numbered column pixel PXe may simultaneously receive the k-th first gate signal GW[k] from the first gate line GWL. The k-th first gate signal GW[k] may be at a high-level voltage (hereinafter, referred to as a 'first level voltage') in the data writing section DW and may be at a low-level voltage (hereinafter, referred to as a 'second level voltage') in the remaining sections. For example, the k-th first gate signal GW[k] may be at the second level voltage in the emission section EP. The period during which the k-th first gate signal GW[k] maintains the first level voltage may be approximately one horizontal period (1H). When the k-th first gate signal GW[k] is at the first level voltage, the second transistor T2 may be turned on, and when the k-th first gate signal GW[k] is at the second level voltage, the second transistor T2 may be turned off.

The second gate line EML may include a 2nd-1 gate line EML1 and a 2nd-2 gate line EML2. In an embodiment, the 2nd-2 gate line EML2 of the k-th row may be connected to the 2nd-1 gate line EML1 of the k+2-th row.

The third transistors T3 of the odd-numbered column pixel PXo and the even-numbered column pixel PXe may simultaneously receive the k-th second gate signal EM[k] from the 2nd-1 gate line EML1. The k-th second gate signal EM[k] may be at the second level voltage in the emission section EP and may be at the first level voltage in the remaining sections. For example, the k-th second gate signal EM[k] may be at the first level voltage in the data writing section DW. When the k-th second gate signal EM[k] is at the second level voltage, the third transistor T3 may be turned on, and when the k-th second gate signal EM[k] is at the first level voltage, the third transistor T3 may be turned off.

The distribution transistors TD of the odd-numbered column pixel PXo and the even-numbered column pixel PXe may simultaneously receive the k+2-th second gate signal EM[k+2] from the 2nd-2 gate line EML2. The k+2-th second gate signal EM[k+2] may be supplied delayed by a certain time DT (e.g., delay time) from the k-th second gate signal EM[k]. The k+2-th second gate signal EM[k+2] may be at the first level voltage from the second data writing section DW2 to a portion of the emission section EP and may be at the second level voltage in the remaining sections. For example, the k+2-th second gate signal EM[k+2] may be at the second level voltage in a latter portion of the emission section EP and in the first data writing section DW1.

When the k+2-th second gate signal EM[k+2] is at the second level voltage, the distribution transistor TD of the odd-numbered column pixel PXo may be turned on, and the distribution transistor TD of the even-numbered column pixel PXe may be turned off. When the k+2-th second gate signal EM[k+2] is at the first level voltage, the distribution transistor TD of the odd-numbered column pixel PXo may be turned off, and the distribution transistor TD of the even-numbered column pixel PXe may be turned on.

In the data writing section DW, the voltage of the k+2-th second gate signal EM[k+2] may change from the second level voltage to the first level voltage. The first level voltage of the first gate signal GW[k] and the second level voltage of the k+2-th second gate signal EM[k+2] may overlap each other in the first data writing section DW1. The first level voltage of the first gate signal GW[k] and the first level voltage of the k+2-th second gate signal EM[k+2] may overlap each other in the second data writing second DW2. The length of the section where the first level voltage of the first gate signal GW[k] and the second level voltage of the k+2-th second gate signal EM[k+2] overlap each other may be equal to the length of the section where the first level voltage of the first gate signal GW[k] and the first level voltage of the k+2-th second gate signal EM[k+2] overlap each other. In other words, the first and second data writing sections DW1 and DW2 may have the same length.

In the data writing section DW, the second transistor T2 of each of the odd-numbered column pixel PXo and the even-numbered column pixel PXe may be turned on by the k-th first gate signal GW[k] having the first level voltage.

In the first data writing section DW1, the distribution transistor TD of the odd-numbered column pixel PXo may be turned on and the distribution transistor TD of the even-numbered column pixel PXe may be turned off by the k+2-th second gate signal EM[k+2] having the second level voltage. The first data signal DATA1 supplied from the first data line DLo may be transmitted to the first node N1 through the turned-on distribution transistor TD and the turned-on second transistor T2 of the odd-numbered column pixel PXo. A voltage corresponding to the first data signal DATA1 may be stored in the capacitor Cst.

In the second data writing section DW2, the distribution transistor TD of the even-numbered column pixel PXe may be turned on and the distribution transistor TD of the odd-numbered column pixel PXo may be turned off by the k+2-th second gate signal EM[k+2] having the first level voltage. The second data signal DATA2 supplied from the second data line DLe may be transmitted to the first node N1 through the turned-on distribution transistor TD and the turned-on second transistor T2 of the even-numbered column pixel PXe. A voltage corresponding to the second data signal DATA2 may be stored in the capacitor Cst.

The emission section EP may be a section in which the organic light-emitting diode OLED emits light. In the emission section EP, the third transistor T3 of each of the odd-numbered column pixel PXo and the even-numbered column pixel PXe may be turned on by the k-th second gate signal EM[k] with the second level voltage. A current path may be formed from the driving voltage line PL to the organic light-emitting diode OLED by the turned-on third transistor T3. The organic light-emitting diode OLED may emit light with a luminance corresponding to the driving current output by the first transistor T1.

The pixel circuit of the pixel PX according to an embodiment is not limited to the pixel circuit shown in FIGS. 5 and 6.

Figure 9:
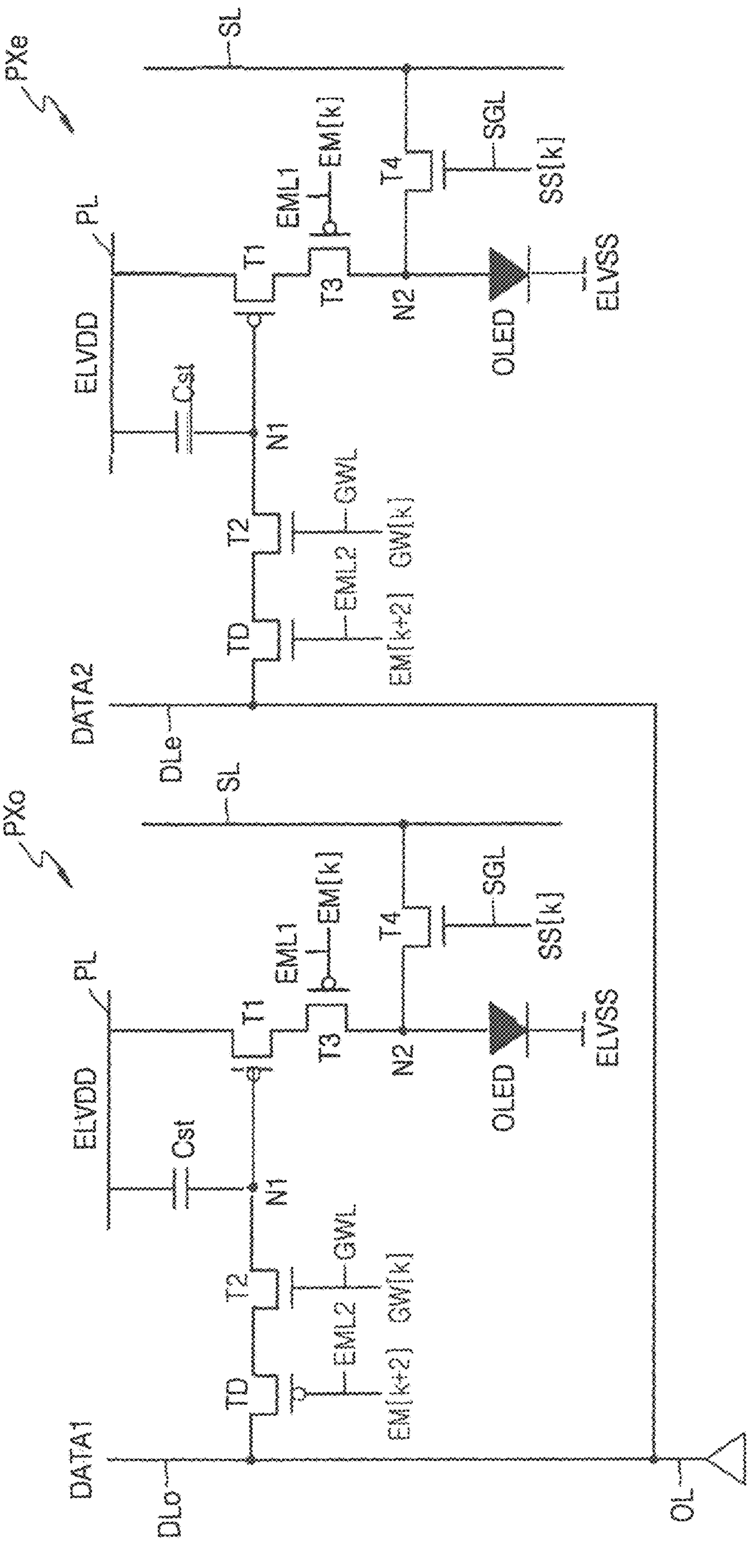
FIGS. 9, 10 and 11 are equivalent circuits schematically showing pixels according to an embodiment.
Figure 10:
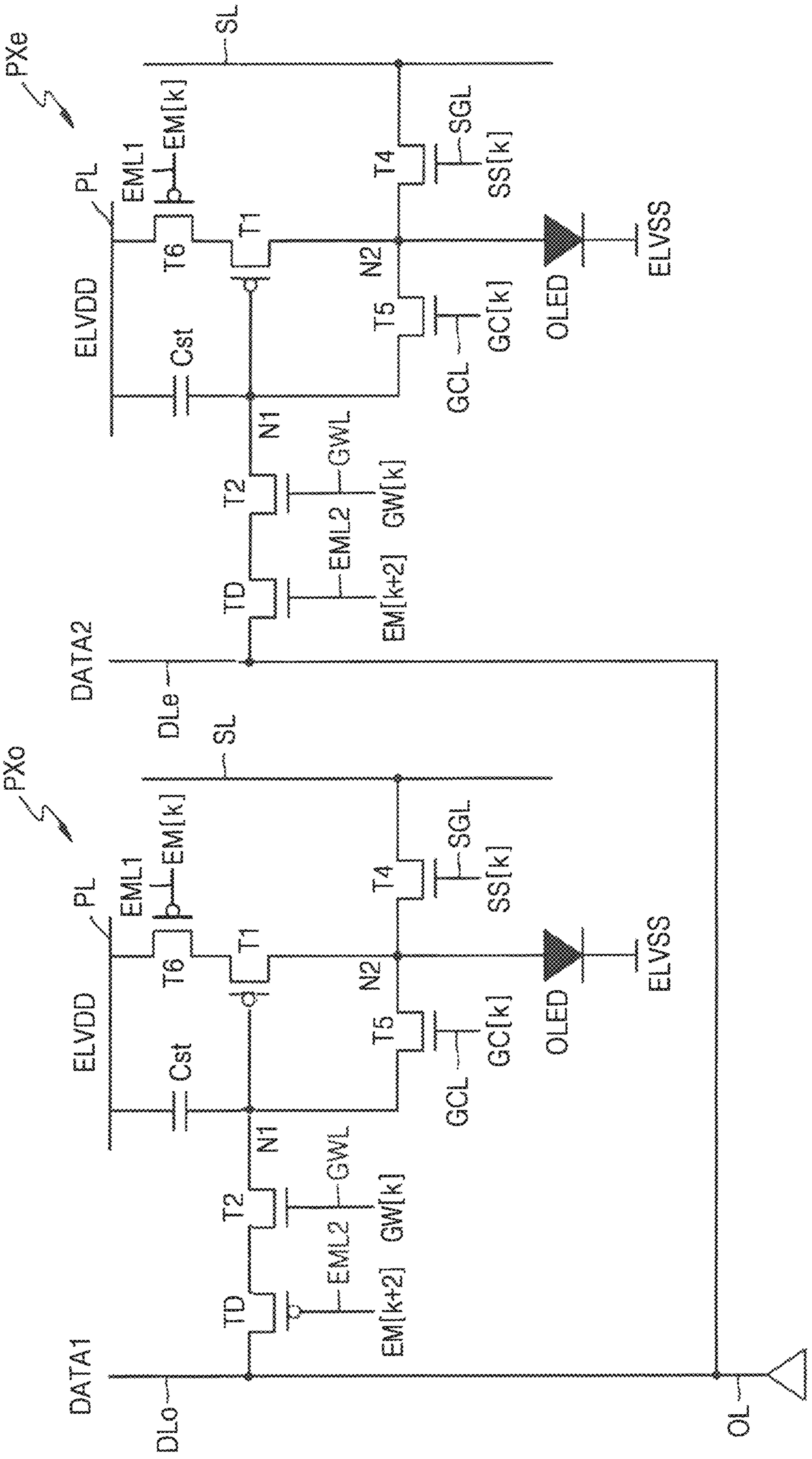
Figure 11:
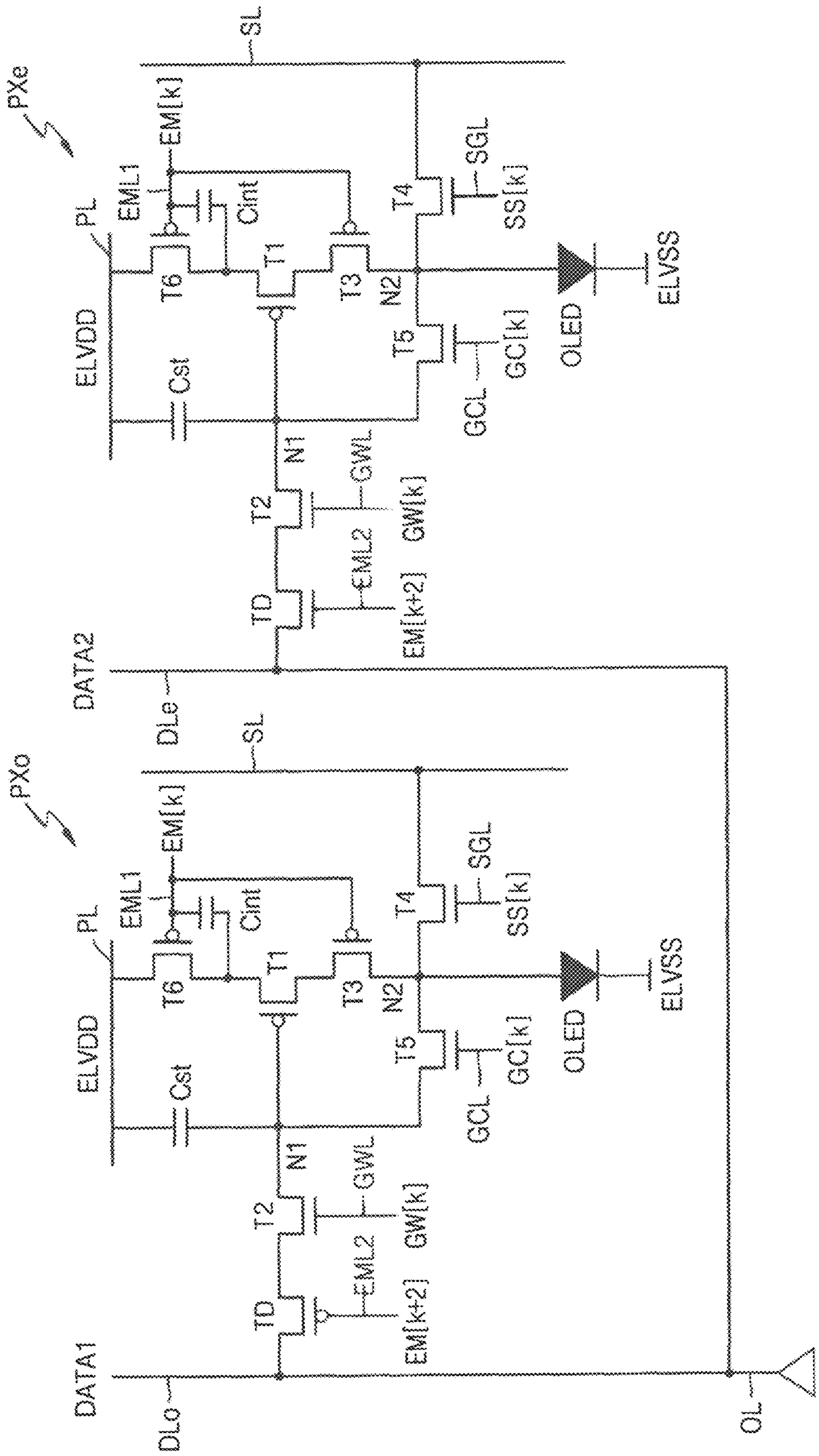

FIGS. 9 to 11 are equivalent circuits schematically showing pixels according to an embodiment. Hereinafter, a description of the same configuration as the odd-numbered column pixel PXo and the even-numbered column pixel PXe shown in FIG. 7 will be omitted, and descriptions will focus on the differences.

Referring to FIG. 9, the odd-numbered column pixel PXo and the even-numbered column pixel PXe shown in FIG. 9 are different from the odd-numbered column pixel PXo and the even-numbered column pixel PXe shown in FIG. 7 in that the fourth transistors T4 of the odd-numbered column pixel PXo and the even-numbered column pixel PXe are N-type oxide transistors. When the third gate signal SS having a high level gate-on voltage is supplied from the third gate line SGL, the fourth transistor T4 may be turned on to electrically connect the pixel PX to the sensing line SL.

Referring to FIG. 10, the odd-numbered column pixel PXo and the even-numbered column pixel PXe shown in FIG. 10 are different from the odd-numbered column pixel PXo and the even-numbered column pixel PXe shown in FIG. 7 in that the third transistor T3 is omitted and a fifth transistor T5 and a sixth transistor T6 are added to the odd-numbered column pixel PXo and the even-numbered column pixel PXe, respectively.

Referring to FIG. 11, the odd-numbered column pixel PXo and the even-numbered column pixel PXe shown in FIG. 11 are different from the odd-numbered column pixel PXo and the even-numbered column pixel PXe shown in FIG. 7 in that a fifth transistor T5 and a sixth transistor T6 are added to the odd-numbered column pixel PXo and the even-numbered column pixel PXe, respectively.

The fifth transistor T5 may be connected to the gate of the first transistor T1 and the organic light-emitting diode OLED. The fifth transistor T5 may include a gate connected to a fourth gate line GCL, a first terminal connected to the first node N1, and a second terminal connected to the second node N2. The fifth transistor T5 may be turned on by a fourth gate signal GC supplied from the fourth gate line GCL and diode-connect the first transistor T1. In an embodiment, the gate-on voltage section of the fourth gate signal GC may overlap the gate-on voltage section of the first gate signal GW.

The sixth transistor T6 may be connected to the driving voltage line PL and the first transistor T1. The sixth transistor T6 may include a gate connected to the 2nd-1 gate line EML1, a first terminal connected to the driving voltage line PL, and a second terminal connected to the first terminal of the first transistor T1. The sixth transistor T6 may be turned on by the second gate signal EM supplied from the 2nd-1 gate line EML1 and form a current path from the driving voltage line PL to the organic light-emitting diode OLED.

The odd-numbered column pixel PXo and even-numbered column pixel PXe shown in FIG. 11 may each further include a second capacitor Cint. The second capacitor Cint may be connected to the gate (or the 2nd-1 gate line) of the sixth transistor T6 and the first terminal of the first transistor T1.

Figure 12:
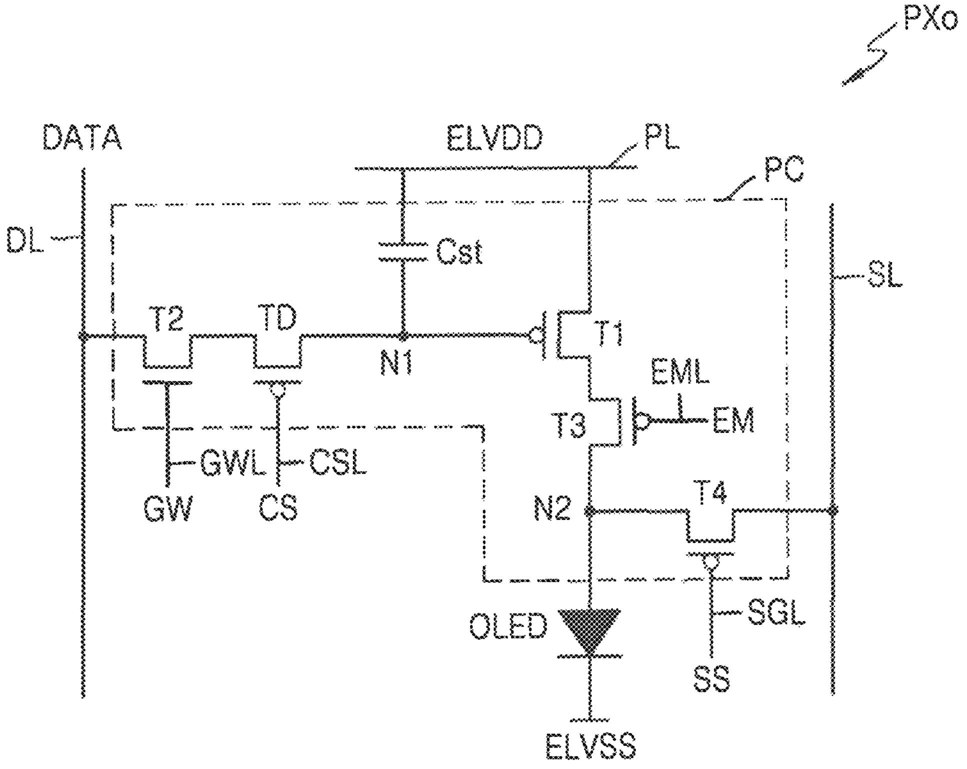
FIGS. 12 and 13 are diagrams schematically showing an equivalent circuit of a pixel according to an embodiment.
Figure 13:
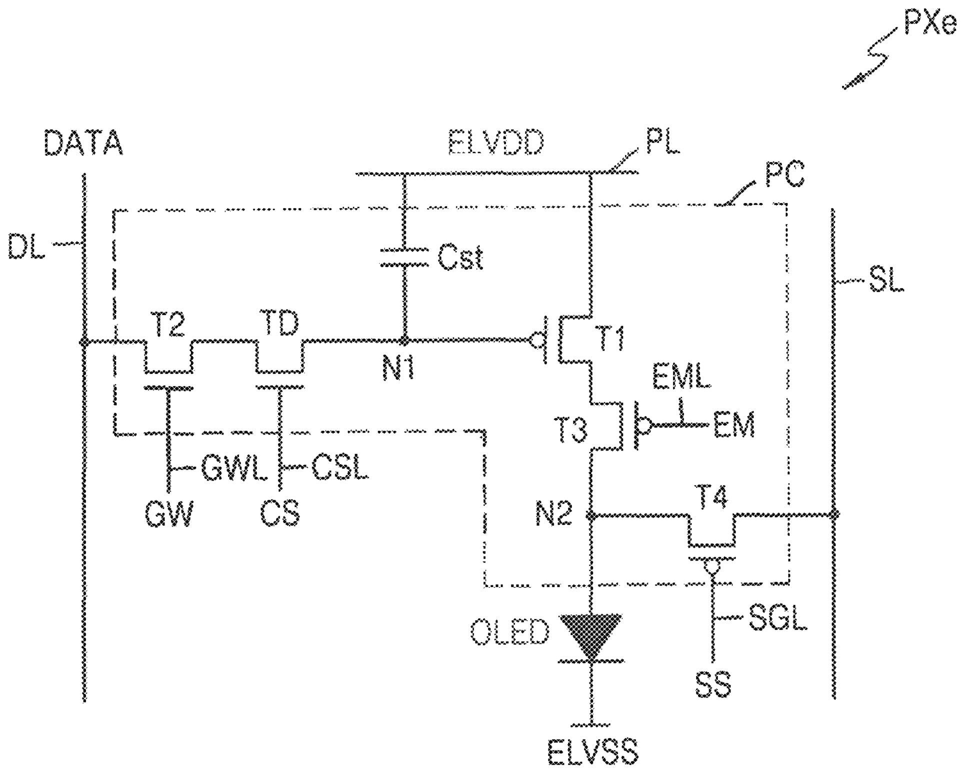

FIGS. 12 and 13 are diagrams schematically showing an equivalent circuit of a pixel according to an embodiment. Hereinafter, a description of the same configuration as the embodiment described above will be omitted, and descriptions will focus on the differences.

The arrangement of the second transistor T2 and distribution transistor TD of each of the odd-numbered column pixel PXo and the even-numbered column pixel PXe respectively shown in FIGS. 12 and 13 is different from the arrangement of the second transistor T2 and distribution transistor TD of each of the odd-numbered column pixel PXo and the even-numbered column pixel PXe respectively shown in FIGS. 4 and 5. The distribution transistor TD of the odd-numbered column pixel PXo may be a P-type silicon transistor, and the distribution transistor TD of the even-numbered column pixel PXe may be an N-type oxide transistor.

The second transistor T2 may be connected between the data line DL and the first node N1. The second transistor T2 may be connected to the data line DL and the distribution transistor TD. The second transistor T2 may include a gate connected to the first gate line GWL, a first terminal connected to the data line DL, and a second terminal connected to the distribution transistor TD. The second transistor T2 may be turned on by the first gate signal GW supplied from the first gate line GWL, electrically connect the data line DL to the first node N1 when the distribution transistor TD is turned on, and transmit the data signal DATA from the data line DL to the first node N1.

The distribution transistor TD may be connected between the data line DL and the first node N1. The distribution transistor TD may be connected to the second transistor T2 and the first node N1. The distribution transistor TD may include a gate connected to the control line CSL, a first terminal connected to the second terminal of the second transistor T2, and a second terminal connected to the first node N1. The distribution transistor TD of the odd-numbered column pixel PXo and the distribution transistor TD of the even-numbered column pixel PXe may each be turned on by the control signal CS, and transmit the data signal DATA from the data line DL, to the first node N1.

Figure 14:
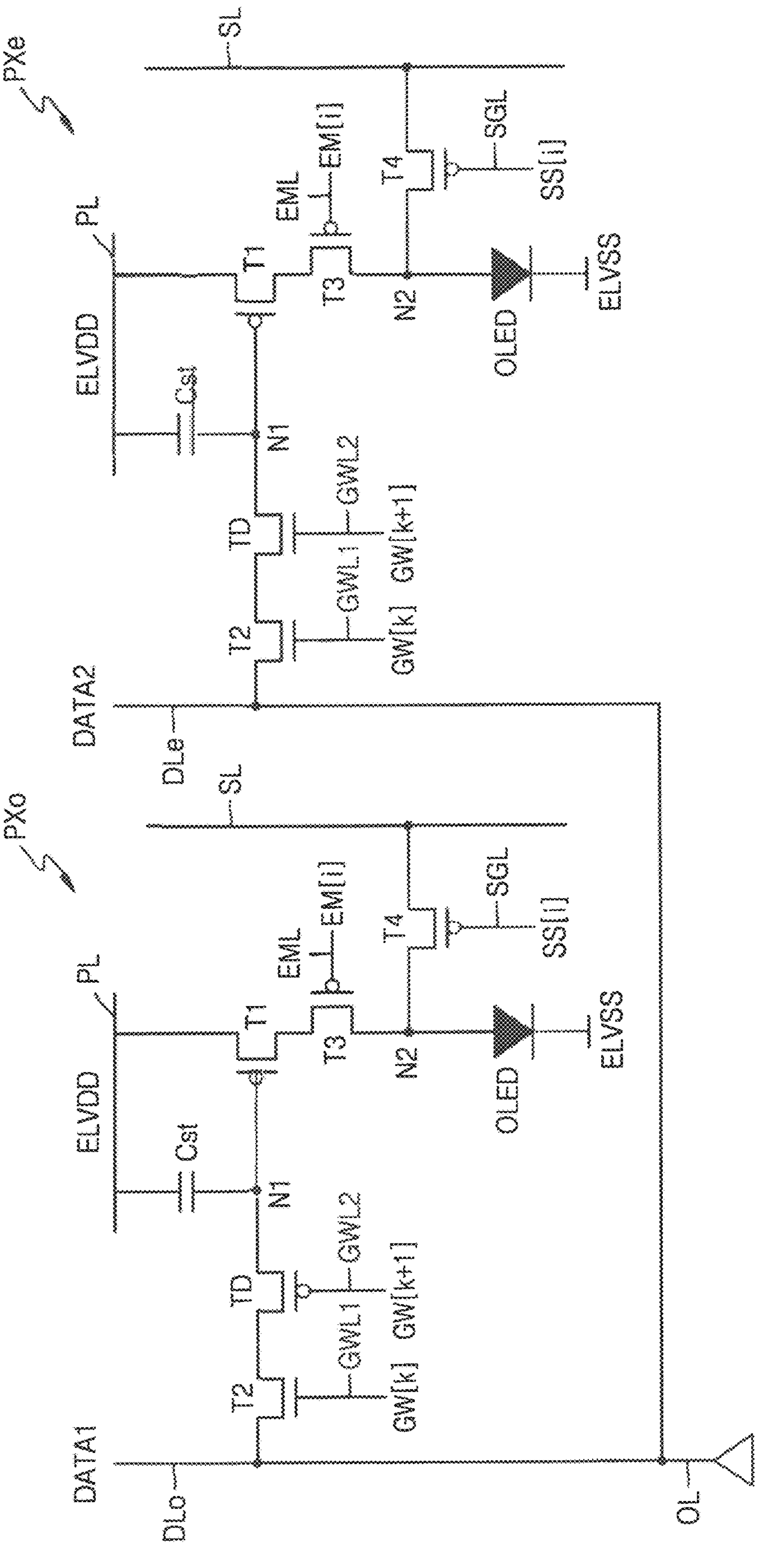
FIGS. 14 and 15 are circuit diagrams schematically showing an odd-numbered column pixel and an even-numbered column pixel according to an embodiment.
Figure 15:
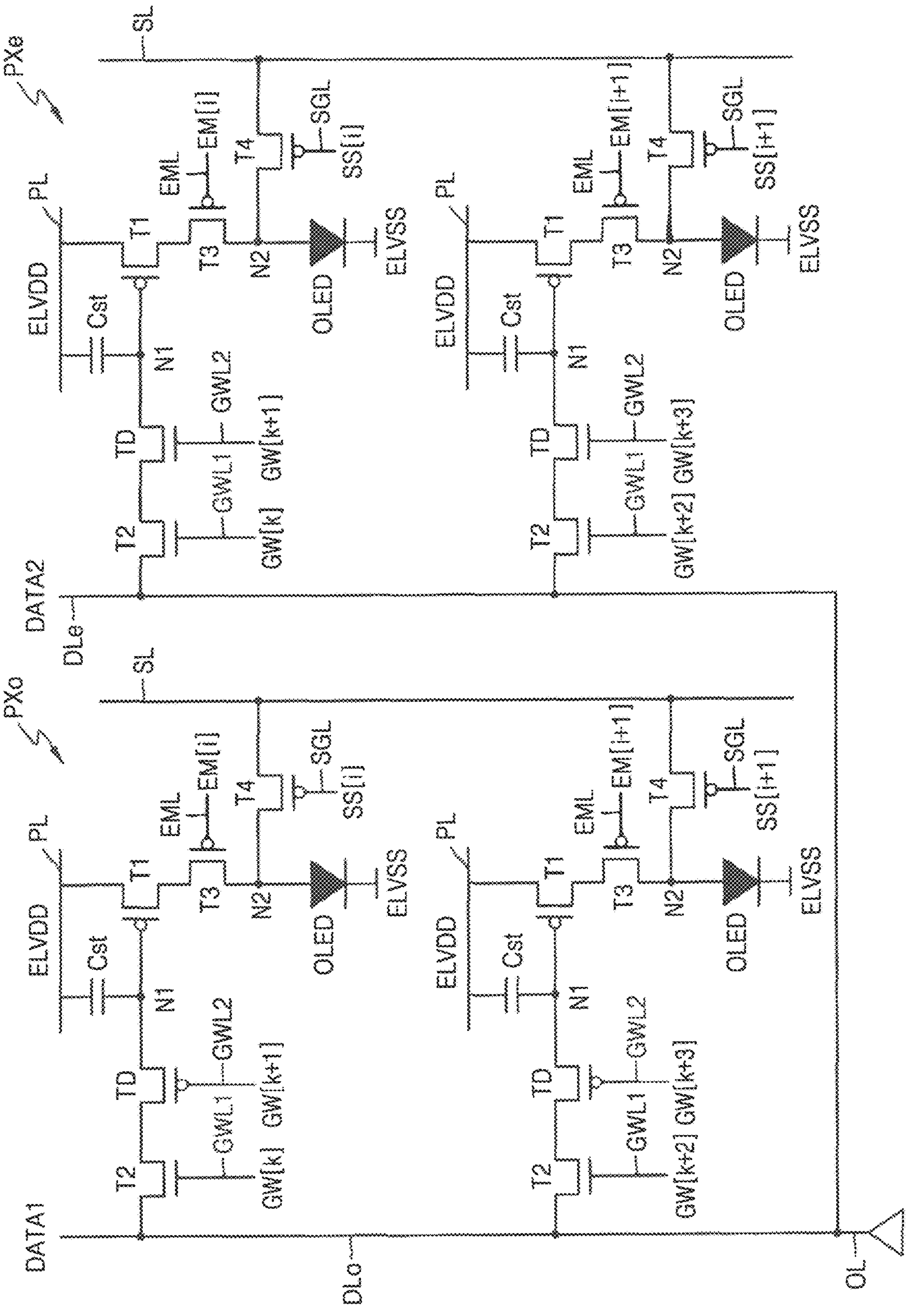
Figure 16:
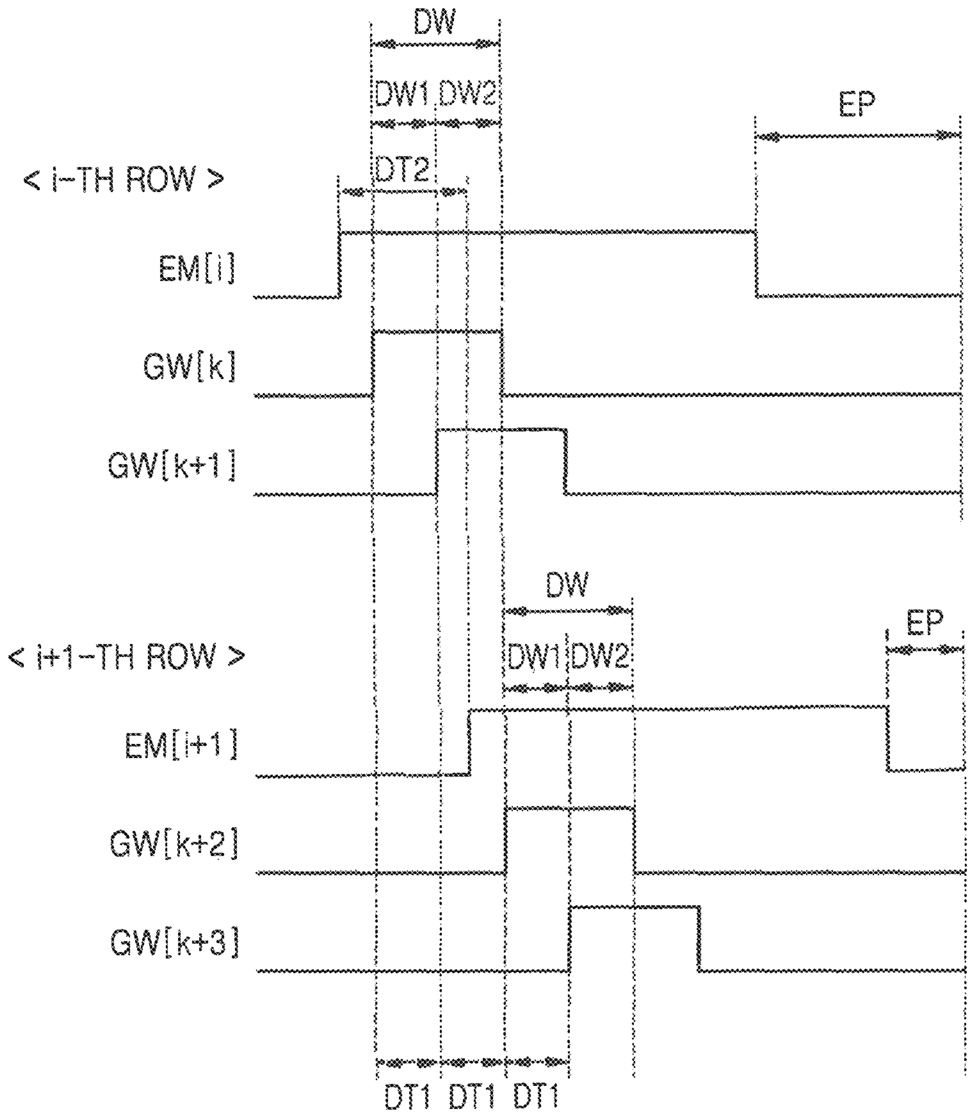
FIG. 16 is a diagram showing signals for explaining operations of the odd-numbered column pixel and the even-numbered column pixel of FIG. 14.

FIGS. 14 and 15 are circuit diagrams schematically showing an odd-numbered column pixel and an even-numbered column pixel according to an embodiment. FIG. 16 is a diagram showing signals for explaining the operations of the odd-numbered column pixel and the even-numbered column pixel of FIG. 14.

In an embodiment, the distribution transistor TD of the odd-numbered pixel PXo and the distribution transistor TD of the even-numbered pixel PXe may be transistors of different conductivity types. For example, as shown in FIG. 14, the distribution transistor TD of the odd-numbered column pixel PXo may be a P-type transistor, and the distribution transistor TD of the even-numbered column pixel PXe may be an N-type transistor. The control line CSL connected to the distribution transistor TD may be the first gate line GWL, and the control signal CS may be the first gate signal GW output by the first driving circuit 121.

The first driving circuit 121 may sequentially output two first gate signals GW to each row. The second driving circuit 123 may output one second gate signal EM to each row. For example, the second driving circuit 123 may output the i-th second gate signal EM[i] to the i-th row, and the first driving circuit 121 may output the k-th first gate signal GW[k] and the k+1-th first gate signal GW[k+1] to the i-th row. The second driving circuit 123 may output the i+1-th second gate signal EM[i+1] to the i+1-th row, and the first driving circuit 121 may output the k+2-th first gate signal GW[k+2] and the k+3-th first gate signal GW[k+3] to the i+1-th row.

FIG. 14 shows an odd-numbered column pixel PXo and an even-numbered column pixel PXe, which are adjacent to each other in any row (e.g., the i-th row) and form a pair. FIG. 15 shows an odd-numbered column pixel PXo and an even-numbered column pixel PXe, which are adjacent to each other in each of two neighboring rows (e.g., the i-th row and the i+1-th row) and form a pair. The output line OL may be connected to a first data line DLo connected to the odd-numbered column pixel PXo and a second data line DLe connected to the even-numbered column pixel PXe. The data driving circuit 150 may supply a first data signal DATA1 to the first data line DLo and a second data signal DATA2 to the second data line DLe through the output line OL.

FIG. 16 shows the first gate signal GW and the second gate signal EM in each of the i-th row and the i+1-th row. Referring to FIG. 16, the driving period of each of the odd-numbered column pixel PXo and the even-numbered column pixel PXe may include a data writing section DW and an emission section EP. The data writing section DW may include a first data writing section DW1 and a second data writing section DW2. In the display mode, the third gate signal SS may be at a first level voltage and the fourth transistors T4 of the odd-numbered column pixel PXo and the even-numbered column pixel PXe may be turned off.

In the i-th row, the first gate line GWL may include a 1st-1 gate line GWL1 connected to the gate of the second transistor T2 and a 1st-2 gate line GWL2 connected to the gate of the distribution transistor TD.

The second transistors T2 of the odd-numbered column pixel PXo and the even-numbered column pixel PXe may simultaneously receive the k-th first gate signal GW[k] from the 1st-1 gate line GWL1. The k-th first gate signal GW[k] may be at a first level voltage in the data writing section DW and be at a second level voltage in the remaining sections. For example, the k-th first gate signal GW[k] may be at the second level voltage in the emission section EP. The period during which the k-th first gate signal GW[k] maintains the first level voltage may be approximately one horizontal period (1H). When the k-th first gate signal GW[k] is at the first level voltage, the second transistor T2 may be turned on, and when the k-th first gate signal GW[k] is at the second level voltage, the second transistor T2 may be turned off.

The distribution transistors TD of the odd-numbered column pixel PXo and the even-numbered column pixel PXe may receive the k+1-th first gate signal GW[k+1] from the 1st-2 gate line GWL2. The k+1-th first gate signal GW[k+1] may be supplied with a delay of a certain time DT1 from the k-th first gate signal GW[k]. The k+1-th first gate signal GW[k+1] may be at a first level voltage in a section of approximately 1H from the first data writing section DW1 and may be at a second level voltage in the remaining sections. For example, the k+1-th first gate signal GW[k+1] may be at the first level voltage in the second data writing section DW2.

In the data writing section DW, the k+1-th first gate signal GW[k+1] may be changed from the second level voltage to the first level voltage. The first level voltage of the k-th first gate signal GW[k] and the second level voltage of the k+1-th first gate signal GW[k+1] may overlap each other in the first data writing section DW1. The first level voltage of the k-th first gate signal GW[k] and the first level voltage of the k+1-th first gate signal GW[k+1] may overlap each other in the second data writing section DW2. The length of the section where the first level voltage of the k-th first gate signal GW[k] and the second level voltage of the k+1-th first gate signal GW[k+1] overlap each other may be equal to the length of the section where the first level voltage of the k-th first gate signal GW[k] and the first level voltage of the k+1-th first gate signal GW[k+1] overlap each other. In other words, the length of the first data writing section DW1 may be equal to the length of the second data writing section DW2.

When the k+1-th first gate signal GW[k+1] is at the first level voltage, the distribution transistor TD of the odd-numbered column pixel PXo may be turned off, and the distribution transistor TD of the even-numbered column pixel PXe may be turned on. When the k+1-th first gate signal GW[k+1] is at the second level voltage, the distribution transistor TD of the odd-numbered column pixel PXo may be turned on, and the distribution transistor TD of the even-numbered column pixel PXe may be turned off.

The third transistors T3 of the odd-numbered column pixel PXo and the even-numbered column pixel PXe may receive the i-th second gate signal EM[i] from the second gate line EML. The i-th second gate signal EM[i] may be at a second level voltage in the emission section EP and may be at a first level voltage in the remaining sections. For example, the i-th second gate signal EM[i] may be at the first level voltage in the data writing section DW. When the i-th second gate signal EM[i] is at the second level voltage, the third transistor T3 may be turned on, and when the i-th second gate signal EM[i] is at the first level voltage, the third transistor T3 may be turned off.

In the data writing section DW, the second transistor T2 of each of the odd-numbered column pixel PXo and the even-numbered column pixel PXe may be turned on by the k-th first gate signal GW[k] having the first level voltage.

In the first data writing section DW1, the distribution transistor TD of the odd-numbered column pixel PXo may be turned on and the distribution transistor TD of the even-numbered column pixel PXe may be turned off by the k+1-th first gate signal GW[k+1] with the second level voltage. The first data signal DATA1 supplied from the first data line DLo may be transmitted to the first node N1 by the turned-on distribution transistor TD and the turned-on second transistor T2 of the odd-numbered column pixel PXo. A voltage corresponding to the first data signal DATA1 may be stored in the capacitor Cst.

In the second data writing section DW2, the distribution transistor TD of the even-numbered column pixel PXe may be turned on and the distribution transistor TD of the odd-numbered column pixel PXo may be turned off by the k+1-th first gate signal GW[k+1] with the first level voltage. The second data signal DATA2 supplied from the second data line DLe may be transmitted to the first node N1 by the turned-on distribution transistor TD and the turned-on second transistor T2 of the even-numbered column pixel PXe. A voltage corresponding to the second data signal DATA2 may be stored in the capacitor Cst.

In the emission section EP, the third transistor T3 of each of the odd-numbered column pixel PXo and the even-numbered column pixel PXe may be turned on by the i-th second gate signal EM[i] having the second level voltage. A current path may be formed from the driving voltage line PL to the organic light-emitting diode OLED by the turned-on third transistor T3. The organic light-emitting diode OLED may emit light with a luminance corresponding to the driving current output by the first transistor T1.

In the i+1 row, the second transistors T2 of the odd-numbered column pixel PXo and the even-numbered column pixel PXe may simultaneously receive the k+2-th first gate signal GW[k+2] from the 1st-1 gate line GWL1. The k+2-th first gate signal GW[k+2] may be delayed by a certain time DT1 from the k+1-th first gate signal GW[k+1]. The k+2-th first gate signal GW[k+2] may be at a first level voltage in the data writing section DW and may be at a second level voltage in the remaining sections. For example, the k+2-th first gate signal GW[k+2] may be at the second level voltage after the data writing section DW. The period during which the k+2-th first gate signal GW[k+2] maintains the first level voltage may be approximately one horizontal period (1H). When the k+2-th first gate signal GW[k+2] is at the first level voltage, the second transistor T2 may be turned on, and when the k+2-th first gate signal GW[k+2] is at the second level voltage, the second transistor T2 may be turned off.

The distribution transistors TD of the odd-numbered column pixel PXo and the even-numbered column pixel PXe may receive the k+3-th first gate signal GW[k+3] from the 1st-2 gate line GWL2. The k+3th first gate signal GW[k+3] may be delayed by a certain time DT1 from the k+2th first gate signal GW[k+2]. The k+3-th first gate signal GW[k+3] may be at a first level voltage in a section of approximately 1H from the first data writing section DW1 and may be at a second level voltage in the remaining sections. In other words, the k+3-th first gate signal GW[k+3] may maintain the first level voltage for a time of about 1H after the first data writing section DW1. It should also be noted that, the certain time DT1 may be a predetermined time.

In the data writing section DW, the k+3-th first gate signal GW[k+3] may be changed from the second level voltage to the first level voltage. The first level voltage of the k+2-th first gate signal GW[k+2] and the second level voltage of the k+3-th first gate signal GW[k+3] may overlap each other in the first data writing section DW1. The first level voltage of the k+2-th first gate signal GW[k+2] and the first level voltage of the k+3-th first gate signal GW[k+3] may overlap each other in the second data writing section DW2. The length of the section where the first level voltage of the k+2-th first gate signal GW[k+2] and the second level voltage of the k+3-th first gate signal GW[k+3] overlap each other may be equal to the length of the section where the first level voltage of the k+2-th first gate signal GW[k+2] and the first level voltage of the k+3-th first gate signal GW[k+3] overlap each other. In this case, the length of the first and second data writing sections DW1 and DW2 may be the same.

When the k+3th first gate signal GW[k+3] is at the second level voltage, the distribution transistor TD of the odd-numbered column pixel PXo may be turned on, and the distribution transistor TD of the even-numbered column pixel PXe may be turned off. When the k+3-th first gate signal GW[k+3] is at the first level voltage, the distribution transistor TD of the odd-numbered column pixel PXo may be turned off, and the distribution transistor TD of the even-numbered column pixel PXe may be turned on.

The third transistors T3 of the odd-numbered column pixel PXo and the even-numbered column pixel PXe may receive the i+1-th second gate signal EM[i+1] from the second gate line EML. The i+1-th second gate signal EM[i+1] may be at a second level voltage in the emission section EP and may be at a first level voltage in the remaining sections such as the first and second data writing sections DW1 and DW2. When the i+1-th second gate signal EM[i+1] is at the second level voltage, the third transistor T3 may be turned on, and when the i+1-th second gate signal EM[i+1] is at the first level voltage, the third transistor T3 may be turned off.

In the data writing section DW, the second transistor T2 of each of the odd-numbered column pixel PXo and the even-numbered column pixel PXe may be turned on by the k+2-th first gate signal GW[k+2] with the first level voltage.

In the first data writing section DW1, the distribution transistor TD of the odd-numbered column pixel PXo may be turned on and the distribution transistor TD of the even-numbered column pixel PXe may be turned off by the k+3-th first gate signal GW[k+3] with the second level voltage. The first data signal DATA1 supplied from the first data line DLo may be transmitted to the first node N1 by the turned-on distribution transistor TD and the turned-on second transistor T2 of the odd-numbered column pixel PXo. A voltage corresponding to the first data signal DATA1 may be stored in the capacitor Cst.

In the second data writing section DW2, the distribution transistor TD of the even-numbered column pixel PXe may be turned on and the distribution transistor TD of the odd-numbered column pixel PXo may be turned off by the k+3-th first gate signal GW[k+3] with the first level voltage. The second data signal DATA2 supplied from the second data line DLe may be transmitted to the first node N1 by the turned-on distribution transistor TD and the turned-on second transistor T2 of the even-numbered column pixel PXe. A voltage corresponding to the second data signal DATA2 may be stored in the capacitor Cst.

In the emission section EP, the third transistor T3 of each of the odd-numbered column pixel PXo and the even-numbered column pixel PXe may be turned on by the i+1-th second gate signal EM[i+1] with the second level voltage. A current path may be formed from the driving voltage line PL to the organic light-emitting diode OLED by the turned-on third transistor T3. The organic light-emitting diode OLED may emit light with a luminance corresponding to the driving current output by the first transistor T1.

The pixel circuit of the pixel PX according to an embodiment is not limited to the pixel circuit shown in FIGS. 12 and 13.

Figure 17:
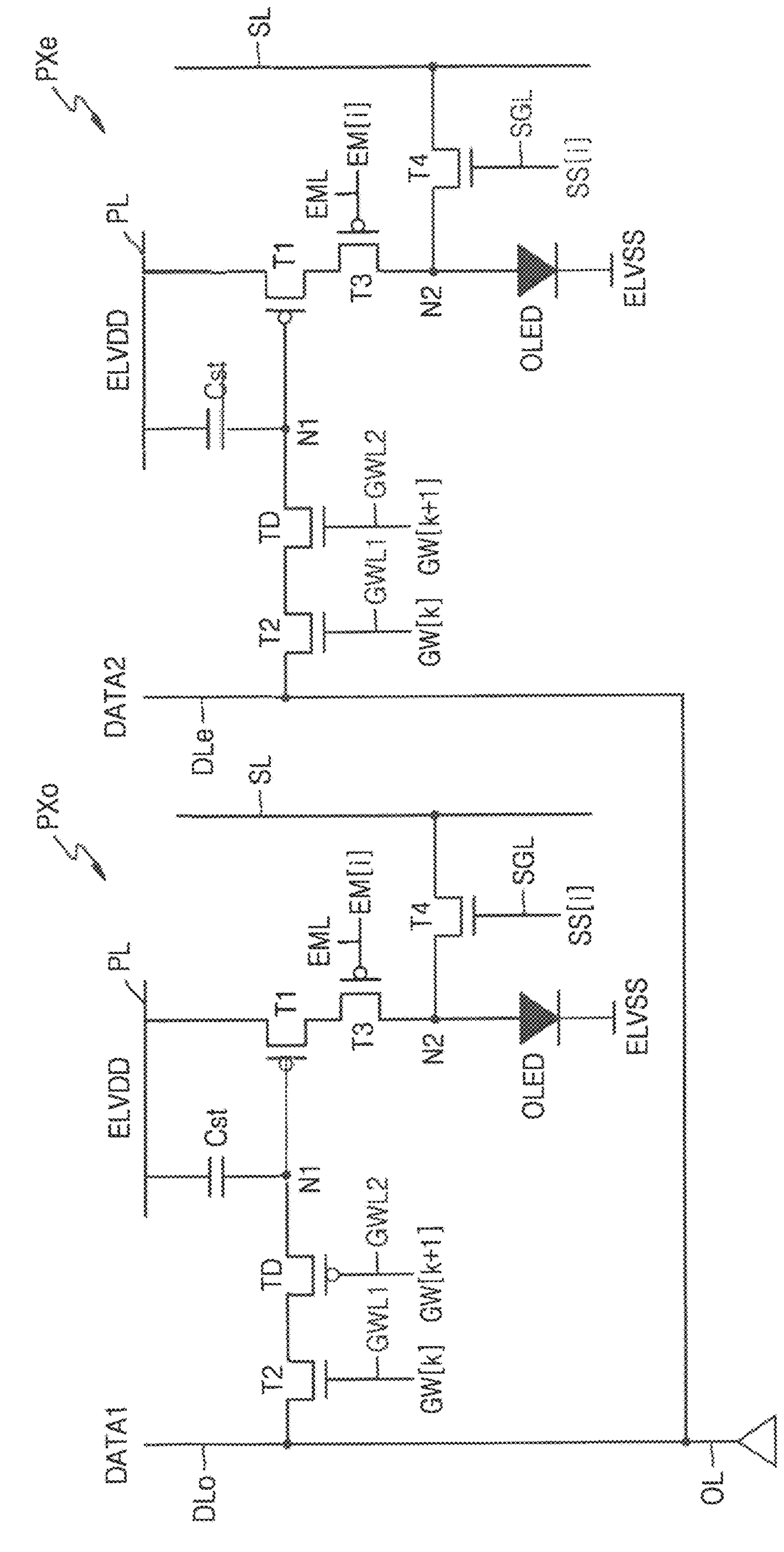
FIGS. 17, 18 and 19 are equivalent circuits schematically showing pixels according to an embodiment.
Figure 18:
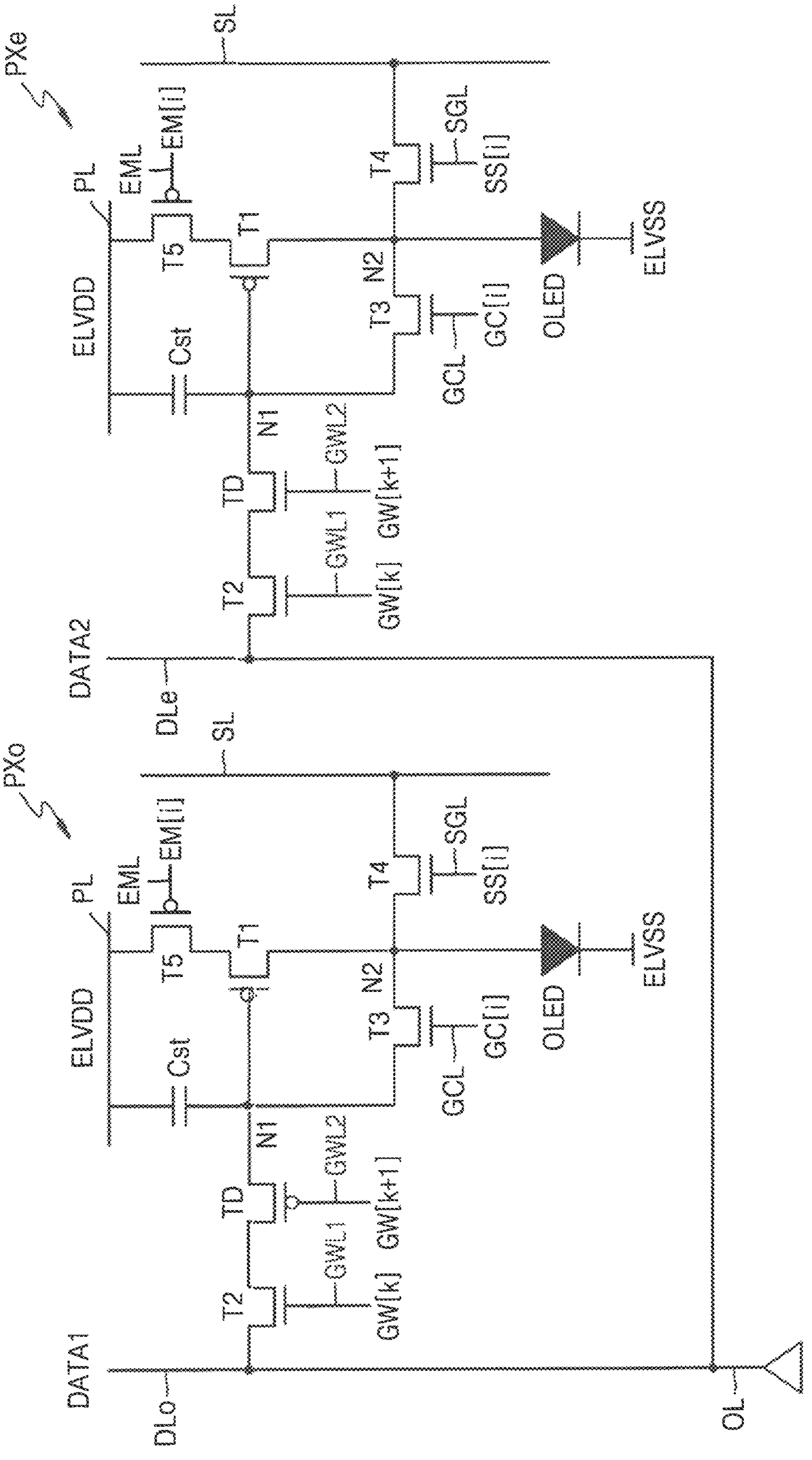
Figure 19:
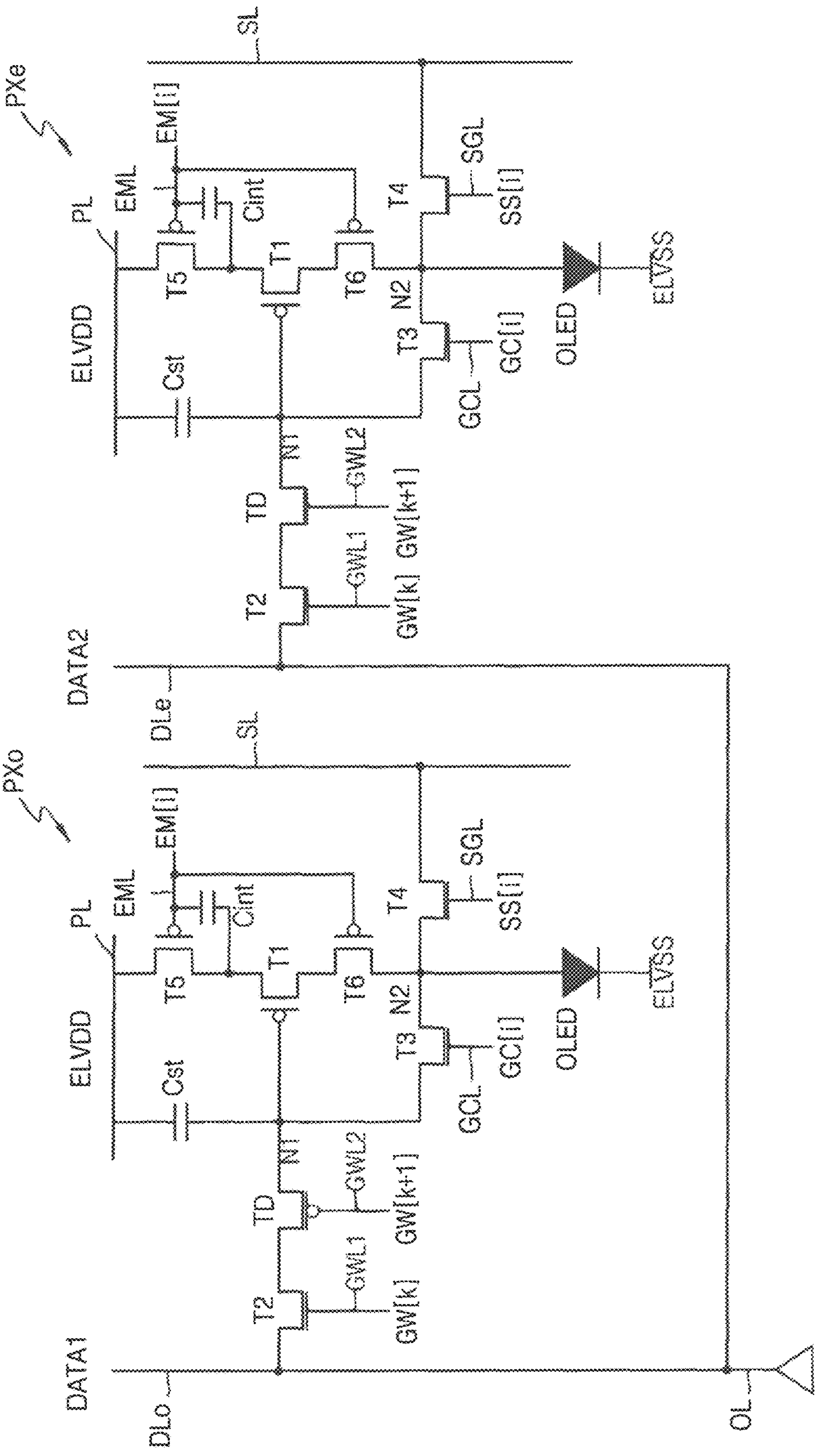

FIGS. 17 to 19 are equivalent circuits schematically showing pixels according to an embodiment. Hereinafter, a description of the same configuration as the odd-numbered column pixel PXo and the even-numbered column pixel PXe shown in FIG. 14 will be omitted, and descriptions will focus on the differences.

Referring to FIG. 17, the odd-numbered column pixel PXo and the even-numbered column pixel PXe shown in FIG. 17 are different from the odd-numbered column pixel PXo and the even-numbered column pixel PXe shown in FIG. 14 in that the fourth transistors T4 of the odd-numbered column pixel PXo and the even-numbered column pixel PXe are N-type oxide transistors. When the third gate signal SS having a high level gate-on voltage is supplied from the third gate line SGL, the fourth transistor T4 may be turned on to electrically connect the pixel PX to the sensing line SL.

Referring to FIG. 18, the odd-numbered column pixel PXo and the even-numbered column pixel PXe shown in FIG. 18 are different from the odd-numbered column pixel PXo and the even-numbered column pixel PXe shown in FIG. 14 in that the third transistor T3 is omitted and a fifth transistor T5 and a sixth transistor T6 are added to the odd-numbered column pixel PXo and the even-numbered column pixel PXe, respectively.

Referring to FIG. 19, the odd-numbered column pixel PXo and the even-numbered column pixel PXe shown in FIG. 19 are different from the odd-numbered column pixel PXo and the even-numbered column pixel PXe shown in FIG. 14 in that a fifth transistor T5 and a sixth transistor T6 are added to the odd-numbered column pixel PXo and the even-numbered column pixel PXe, respectively. The odd-numbered column pixel PXo and the even-numbered column pixel PXe shown in FIG. 19 may each further include a second capacitor Cint.

Because the fifth transistor T5, the sixth transistor T6, and the second capacitor Cint are the same as those described with reference to FIGS. 10 and 11, descriptions thereof are omitted.

In the embodiments described above, supplying a signal refers to providing a gate-on voltage (e.g., a low-level voltage supplied to a P-type transistor or a high-level voltage supplied to an N-type transistor), and not supplying a signal refers to providing a gate-off voltage (e.g., a high-level voltage supplied to a P-type transistor or a low-level voltage supplied to an N-type transistor).

In an embodiment, the odd-numbered column pixel PXo and the even-numbered column pixel PXe may respectively include distribution transistors TD of different conductivity types. While the first gate signal GW is supplied, the distribution transistors TD may be alternately turned on at different timings by using the second gate signal EM or the first gate signal GW. Accordingly, an odd-numbered column data signal DATA and an even-numbered column data signal DATA supplied from the output line OL may be sequentially supplied to the odd-numbered column pixel PXo and the even-numbered column pixel PXe.

Since the display apparatus according to the aforementioned embodiments includes a distribution transistor in a pixel, the data lines DL1 to DLm may be selectively connected to a pixel circuit. This allows two or more data signals supplied through a single output line to be time-divided and supplied to two or more data lines. As a result, there is no need for a separate driving circuit to time-divide data signals between the data driving circuit and the data lines, thereby reducing the peripheral area and lowering manufacturing costs.

In the display apparatus according to the aforementioned embodiments, gate signals supplied to transistors in a pixel circuit control distribution transistors of an odd-numbered column pixel and an even-numbered column pixel, eliminating the need for a separate control signal and reducing power consumption. While the above embodiments describe a display apparatus where two data lines in two columns are connected to one output line, the embodiments of the disclosure are not limited thereto. For example, three or more data lines in three or more columns may be connected to one output line. By sequentially turning on distribution transistors of pixels arranged in three or more columns by using three or more gate signals, with gate-on voltages delayed by non-overlapping time differences, data signals may be supplied to three or more columns in a time-division manner.

The display apparatus according to embodiments of the disclosure may be implemented as electronic devices, such as smartphones, mobile phones, smart watches, navigation devices, game consoles, TVs, vehicle head units, notebook computers, laptop computers, tablet computers, personal media players (PMPs), and personal digital assistants (PDAs). The electronic devices may be flexible.

According to the embodiments, the number of output lines in the data driving circuit may be reduced, leading to lower manufacturing costs for the display apparatus. However, the scope of this disclosure is not limited to the effect mentioned above.

It should be understood that the embodiments described herein are intended to be descriptive rather than limiting.

Feature or aspects of one embodiment may generally be considered applicable to similar features or aspects in other embodiments. While one or more embodiments have been described with reference to the figures, it will be understood by those of ordinary skill in the art that various changes in form and detail may be made thereto without departing from the spirit and scope of the disclosure as set forth in the following claims.

What is claimed is:

1. A display apparatus comprising:

a first pixel in an odd-numbered column; and a second pixel in an even-numbered column and in a same row as the first pixel, wherein each of the first pixel and the second pixel comprises:

a light-emitting device;

a first transistor configured to output a current corresponding to a data signal;

a second transistor comprising a first terminal connected to a distribution transistor and a second terminal connected to a gate of the first transistor;

a sensing transistor comprising a first terminal connected to an anode of the light-emitting device and a second terminal connected to a sensing line; and a distribution transistor connected in series with the second transistor, and comprising a first terminal connected to a data line configured to supply the data signal and a second terminal connected to the first terminal of the second transistor, wherein a conductivity type of the distribution transistor of the first pixel is different from a conductivity type of the distribution transistor of the second pixel, and when the second transistor of the first pixel and the second transistor of the second pixel are turned on, the distribution transistor of the first pixel and the distribution transistor of the second pixel are sequentially turned on.

2. The display apparatus of claim 1, further comprising:

an output line connected to a first data line connected to the first pixel and a second data line connected to the second pixel; and a driving circuit connected to the output line and configured to supply the data signal through the output line.

3. The display apparatus of claim 1, wherein a first terminal of the first transistor is connected to a driving voltage line, and each of the first pixel and the second pixel further comprises:

a third transistor comprising a first terminal connected to a second terminal of the first transistor and a second terminal connected to the light-emitting device; and a capacitor connected to the driving voltage line and the gate of the first transistor.

4. The display apparatus of claim 3, wherein a first gate signal is supplied to a gate of the second transistor of the first pixel and a gate of the second transistor of the second pixel, a second gate signal is supplied to a gate of the third transistor of the first pixel and a gate of the third transistor of the second pixel, and a sensing gate signal is supplied to a gate of the sensing transistor of the first pixel and a gate of the sensing transistor of the second pixel.

5. The display apparatus of claim 4, wherein a delayed second gate signal, which is delayed from the second gate signal supplied to the gate of the third transistor of the first pixel, is supplied to a gate the distribution transistor of the first pixel and a gate of the distribution transistor of the second pixel, and a voltage level of the delayed second gate signal changes in a time period where the first gate signal is at a level voltage that turns on the second transistor.

6. The display apparatus of claim 1, wherein each of the first pixel and the second pixel further comprises:

a third transistor comprising a first terminal connected to a driving voltage line and a second terminal connected to a first terminal of the first transistor;

a fourth transistor comprising a first terminal connected to the gate of the first transistor and a second terminal connected to an anode of the light-emitting device; and a capacitor connected to the driving voltage line and the gate of the first transistor.

7. The display apparatus of claim 6, wherein a first gate signal is supplied to a gate of the second transistor of the first pixel and a gate of the second transistor of the second pixel, a second gate signal is supplied to a gate of the third transistor of the first pixel and a gate of the third transistor of the second pixel, a sensing gate signal is supplied to a gate of the sensing transistor of the first pixel and a gate of the sensing transistor of the second pixel, and a fourth gate signal is supplied to a gate of the fourth transistor of the first pixel and a gate of the fourth transistor of the second pixel.

8. The display apparatus of claim 7, wherein a delayed second gate signal, which is delayed from the second gate signal supplied to the gate of the third transistor of the first pixel, is supplied to a gate of the distribution transistor of the first pixel and a gate of the distribution transistor of the second pixel, and a voltage level of the delayed second gate signal changes in a time period where the first gate signal is at a level voltage that turns on the second transistor.

9. The display apparatus of claim 8, wherein each of the first pixel and the second pixel further comprises:

a fifth transistor comprising a first terminal connected to a second terminal of the first transistor and a second terminal connected to the light-emitting device; and a second capacitor connected to the gate of the third transistor and the first terminal of the first transistor, wherein a second gate signal is supplied to a gate of the fifth transistor of the first pixel and a gate of the fifth transistor of the second pixel.

10. The display apparatus of claim 1, wherein a conductivity type of the sensing transistor is a same as a conductivity type of the distribution transistor of the first pixel or a conductivity type of the distribution transistor of the second pixel.

11. A display apparatus comprising:

a first pixel in an odd-numbered column; and a second pixel in an even-numbered column and in a same row as the first pixel, wherein each of the first pixel and the second pixel comprises:

a light-emitting device;

a first transistor configured to output a current corresponding to a data signal;

a second transistor comprising a first terminal connected to a data line configured to supply the data signal, and a second terminal connected to a distribution transistor;

a sensing transistor comprising a first terminal connected to the light-emitting device and a second terminal connected to a sensing line; and a distribution transistor connected in series with the second transistor, and comprising a first terminal connected to the second terminal of the second transistor and a second terminal connected to a gate of the first transistor, wherein a conductivity type of the distribution transistor of the first pixel is different from a conductivity type of the distribution transistor of the second pixel, and when the second transistor of the first pixel and the second transistor of the second pixel are turned on, the distribution transistor of the first pixel and the distribution transistor of the second pixel are sequentially turned on.

12. The display apparatus of claim 11, further comprising:

an output line connected to a first data line connected to the first pixel and a second data line connected to the second pixel; and a driving circuit connected to the output line and configured to supply the data signal through the output line.

13. The display apparatus of claim 11, wherein a first terminal of the first transistor is connected to a driving voltage line, and each of the first pixel and the second pixel further comprises:

a third transistor comprising a first terminal connected to a second terminal of the first transistor and a second terminal connected to the light-emitting device; and a capacitor connected to the driving voltage line and the gate of the first transistor.

14. The display apparatus of claim 13, wherein a first gate signal is supplied to a gate the second transistor of the first pixel and a gate of the second transistor of the second pixel, a second gate signal is supplied to a gate of the third transistor of the first pixel and a gate of the third transistor of the second pixel, and a sensing gate signal is supplied to a gate of the sensing transistor of the first pixel and a gate of the sensing transistor of the second pixel.

15. The display apparatus of claim 14, wherein a delayed first gate signal, which is delayed from the first gate signal supplied to the gate of the second transistor of the first pixel, is supplied to a gate of the distribution transistor of the first pixel and a gate of the distribution transistor of the second pixel, and a voltage level of the delayed first gate signal changes in a time period where the first gate signal is at a level voltage that turns on the second transistor.

16. The display apparatus of claim 11, wherein each of the first pixel and the second pixel further comprises:

a third transistor comprising a first terminal connected to a driving voltage line and a second terminal connected to a first terminal of the first transistor;

a fourth transistor comprising a first terminal connected to a gate of the first transistor and a second terminal connected to the light-emitting device; and a capacitor connected to the driving voltage line and the gate of the first transistor.

17. The display apparatus of claim 16, wherein a first gate signal is supplied to a gate of the second transistor of the first pixel and a gate of the second transistor of the second pixel, a second gate signal is supplied to a gate of the third transistor of the first pixel and a gate of the third transistor of the second pixel, a sensing gate signal is supplied to a gate of the sensing transistor of the first pixel and a gate of the sensing transistor of the second pixel, and a fourth gate signal is supplied to a gate of the fourth transistor of the first pixel and a gate of the fourth transistor of the second pixel.

18. The display apparatus of claim 17, wherein a delayed first gate signal, which is delayed from the first gate signal supplied to the gate of the second transistor of the first pixel, is supplied to a gate of the distribution transistor of the first pixel and to a gate of the distribution transistor of the second pixel, and a voltage level of the delayed first gate signal changes in a time period where the first gate signal is at a level voltage that turns on the second transistor.

19. The display apparatus of claim 18, wherein each of the first pixel and the second pixel further comprises:

a fifth transistor comprising a first terminal connected to a second terminal of the first transistor and a second terminal connected to the light-emitting device; and a second capacitor connected to the gate of the third transistor and the first terminal of the first transistor, wherein the second gate signal is supplied to a gate of the fifth transistor of the first pixel and the fifth transistor of the second pixel.

20. The display apparatus of claim 11, wherein a conductivity type of the sensing transistor is a same as a conductivity type of the distribution transistor of the first pixel or a conductivity type of the distribution transistor of the second pixel.

* * * * *